(12) United States Patent
Jung et al.

(10) Patent No.: US 12,408,163 B2
(45) Date of Patent: Sep. 2, 2025

(54) IDENTIFYING A RESOURCE FOR TRANSMITTING A FIRST UPLINK CHANNEL

(71) Applicant: Motorola Mobility LLC, Chicago, IL (US)

(72) Inventors: Hyejung Jung, Northbrook, IL (US); Ravikiran Nory, Buffalo Grove, IL (US); Vijay Nangia, Woodridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 720 days.

(21) Appl. No.: 17/504,371

(22) Filed: Oct. 18, 2021

(65) Prior Publication Data

US 2022/0046675 A1 Feb. 10, 2022

Related U.S. Application Data

(63) Continuation of application No. 16/719,524, filed on Dec. 18, 2019, now Pat. No. 11,153,896, which is a (Continued)

(51) Int. Cl.
*H04L 1/1829* (2023.01)
*H04L 1/1812* (2023.01)
(Continued)

(52) U.S. Cl.
CPC ....... *H04W 72/1268* (2013.01); *H04L 1/1812* (2013.01); *H04L 1/1854* (2013.01); *H04L 1/1861* (2013.01); *H04L 1/1864* (2013.01); *H04L 5/0055* (2013.01); *H04W 72/20* (2023.01); *H04W 72/54* (2023.01); (Continued)

(58) Field of Classification Search
None
See application file for complete search history.

(56) References Cited

U.S. PATENT DOCUMENTS 10,021,686 B1 * 7/2018 Oroskar ............ H04W 72/0446
2008/0273513 A1 11/2008 Montojo et al.
(Continued)

FOREIGN PATENT DOCUMENTS

EP 3043502 A1 7/2016
WO 2016/162090 A1 10/2016

OTHER PUBLICATIONS

NTT DOCOMO Inc., "sPUSCH for shortened TTI", 3GPP TSG RAN WG1 Meeting #86bis R1-1610048, Oct. 10-14, 2016, pp. 1-8.

*Primary Examiner* — Robert M Morlan
(74) *Attorney, Agent, or Firm* — Kunzler Bean & Adamson

(57) ABSTRACT

For transmitting an uplink channel, one apparatus includes a processor and a transceiver that that communicates with a User Equipment ("UE") in a mobile communication network. The processor receives, from the UE, a first uplink channel on a first uplink resource and receiving, from the UE, a second uplink channel on a second uplink resource, where the first uplink resource and the second uplink resource at least partially overlap in time, and where the first uplink channel is for a first transmission and reception point ("TRP") and the second uplink channel is for a second TRP, wherein the first TRP is different than the second TRP.

18 Claims, 17 Drawing Sheets

Related U.S. Application Data continuation of application No. 15/804,947, filed on Nov. 6, 2017, now Pat. No. 10,531,479.

(60) Provisional application No. 62/418,010, filed on Nov. 4, 2016.

(51) Int. Cl.
| | |
|---|---|
| *H04L 5/00* | (2006.01) |
| *H04W 72/1268* | (2023.01) |
| *H04W 72/20* | (2023.01) |
| *H04W 72/54* | (2023.01) |
| *H04B 7/0404* | (2017.01) |
| *H04B 7/0408* | (2017.01) |
| *H04B 7/06* | (2006.01) |

(52) U.S. Cl.
CPC .......... *H04B 7/0404* (2013.01); *H04B 7/0408* (2013.01); *H04B 7/0617* (2013.01); *H04L 5/0007* (2013.01); *H04L 5/001* (2013.01)

(56) References Cited

U.S. PATENT DOCUMENTS

| | | |
|---|---|---|
| 2009/0245194 A1 | 10/2009 | Damnjanovic et al. |
| 2014/0269547 A1 | 9/2014 | Valliappan et al. |
| 2017/0041103 A1 | 2/2017 | Maattanen et al. |
| 2017/0290030 A1* | 10/2017 | Wang .................... H04W 72/21 |
| 2017/0346605 A1 | 11/2017 | Chendamarai Kannan et al. |
| 2018/0006791 A1 | 1/2018 | Marinier et al. |
| 2018/0014298 A1* | 1/2018 | Sun ....................... H04W 72/21 |
| 2018/0110042 A1 | 4/2018 | Chen et al. |
| 2018/0139773 A1 | 5/2018 | Ma et al. |

\* cited by examiner

IDENTIFYING A RESOURCE FOR TRANSMITTING A FIRST UPLINK CHANNEL

CROSS-REFERENCE TO RELATED APPLICATIONS

This application claims priority to U.S. patent application Ser. No. 16/719,524 entitled "IDENTIFYING A RESOURCE FOR TRANSMITTING A FIRST UPLINK CHANNEL" and filed on Dec. 18, 2019 for Hyejung Jung, Ravikiran Nory, and Vijay Nangia, and to U.S. patent application Ser. No. 15/804,947 entitled "IDENTIFYING A RESOURCE FOR TRANSMITTING A FIRST UPLINK CHANNEL" and filed on Nov. 6, 2017 for Hyejung Jung, Ravikiran Nory, and Vijay Nangia, and to U.S. Provisional Patent Application No. 62/418,010 entitled "METHODS TO MULTIPLEX PHYSICAL CHANNEL AND SIGNALS FOR FLEXIBLE RADIO COMMUNICATION" and filed on Nov. 4, 2016 for Hyejung Jung, Ravikiran Nory, and Vijay Nangia, which applications are incorporated herein by reference.

FIELD

The subject matter disclosed herein relates generally to wireless communications and more particularly relates to communicating a short-duration uplink channel, such as PUCCH or PUSCH.

BACKGROUND

The following abbreviations and acronyms are herewith defined, at least some of which are referred to within the following description.

Third Generation Partnership Project ("3GPP"), Access and Mobility Management Function ("AMF"), Carrier Aggregation ("CA"), Clear Channel Assessment ("CCA"), Control Channel Element ("CCE"), Channel State Information ("CSI"), Common Search Space ("CSS"), Downlink Control Information ("DCI"), Downlink ("DL"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Resource Unit ("FRU"), Guard Period ("GP"), Hybrid Automatic Repeat Request ("HARQ"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTA Advanced ("LTE-A"), Medium Access Control ("MAC"), Multiple Access ("MA"), Modulation Coding Scheme ("MCS"), Machine Type Communication ("MTC"), Massive MTC ("mMTC"), Multiple Input Multiple Output ("MIMO"), Multipath TCP ("MPTCP"), Multi User Shared Access ("MUSA"), Narrowband ("NB"), Network Function ("NF"), Next Generation Node B ("gNB"), Policy Control & Charging ("PCC"), Policy Control Function ("PCF"), Quality of Service ("QoS"), Quadrature Phase Shift Keying ("QPSK"), Resource Block ("RB"), Radio Resource Control ("RRC"), Receive ("RX"), Switching/Splitting Function ("SSF"), Scheduling Request ("SR"), Session Management Function ("SMF"), System Information Block ("SIB"), Transport Block ("TB"), Transport Block Size ("TBS"), Transmission Control Protocol ("TCP"), Time-Division Duplex ("TDD"), Time Division Multiplex ("TDM"), Time Resource Unit ("TRU"), Transmission and Reception Point ("TRP"), Transmit ("TX"), Uplink Control Information ("UCI"), User Datagram Protocol ("UDP"), User Entity/Equipment (Mobile Terminal) ("UE"), Uplink ("UL"), Physical Downlink Control Channel ("PDCCH"), Physical Downlink Shared Channel ("PDSCH"), Physical Uplink Control Channel ("PUCCH"), Physical Uplink Shared Channel ("PUSCH"), Physical Resource Block ("PRB"), Universal Mobile Telecommunications System ("UMTS"), Ultra-reliability and Low-latency Communications ("URLLC"), and Worldwide Interoperability for Microwave Access ("WiMAX").

In an LTE mobile communication network, a user equipment ("UE") transmits uplink control messages on a physical uplink control channel ("PUCCH"). The PUCCH carries uplink control information ("UCI") such as HARQ-ACK feedback, scheduling request ("SR"), and channel state information ("CSI"), and generally spans the entire subframe duration (i.e. 1 millisecond or 14 OFDM symbol durations).

The long transmission time of LTE PUCCH is not suitable to achieve HARQ round trip time (RTT) as short as 1 slot period in fifth generation radio access (e.g., 1 ms or 0.5 ms). Moreover, for low-latency communication, DL-to-UL switching may occur in every slot (e.g., 7 or 14 OFDM symbols). Thus, a guard period ("GP") based on the maximum expected propagation delay in a cell would lead a very high GP overhead. Considering that the minimum GP in LTE TDD is one OFDM symbol period, the minimum GP overhead with 1 ms switching cycle is 14% or 7%, i.e. 1 symbol GP out of every 7 or 14 symbols.

BRIEF SUMMARY

Methods for communicating a short-duration uplink channel are disclosed. Apparatuses and systems also perform the functions of the methods.

One method of a UE for transmitting uplink channel includes receiving first scheduling information to transmit a first uplink channel on a first uplink resource in a slot and receiving second scheduling information to transmit a second uplink channel on a second uplink resource in the slot. Here, the first uplink resource and the second uplink resource at least partially overlap in the time domain. Additionally, the first scheduling information is received later than the second scheduling information and the second uplink resource is larger than the first uplink resource in the time domain. The first method includes transmitting the first and second uplink channels, including transmitting the first uplink channel on the first uplink resource including the overlap time and transmitting a part of the second uplink channel on a part of the second uplink resource excluding at least the overlap time.

Another method of a UE for transmitting uplink channel includes receiving first scheduling information to transmit a first uplink channel on a first uplink resource in a slot and receiving second scheduling information to transmit a second uplink channel on a second uplink resource in the slot. Here, the first uplink resource and the second uplink resource at least partially overlap in the time domain, wherein the second uplink resource is larger than the first uplink resource in the time domain. The second method includes transmitting the first and second uplink channels during the overlap time. Here, the UE supports transmissions with more than one transmit antenna panel at a given time instance, wherein the first uplink channel is transmitted with a first transmit antenna panel and the second uplink channel is transmitted with a second transmit antenna panel.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
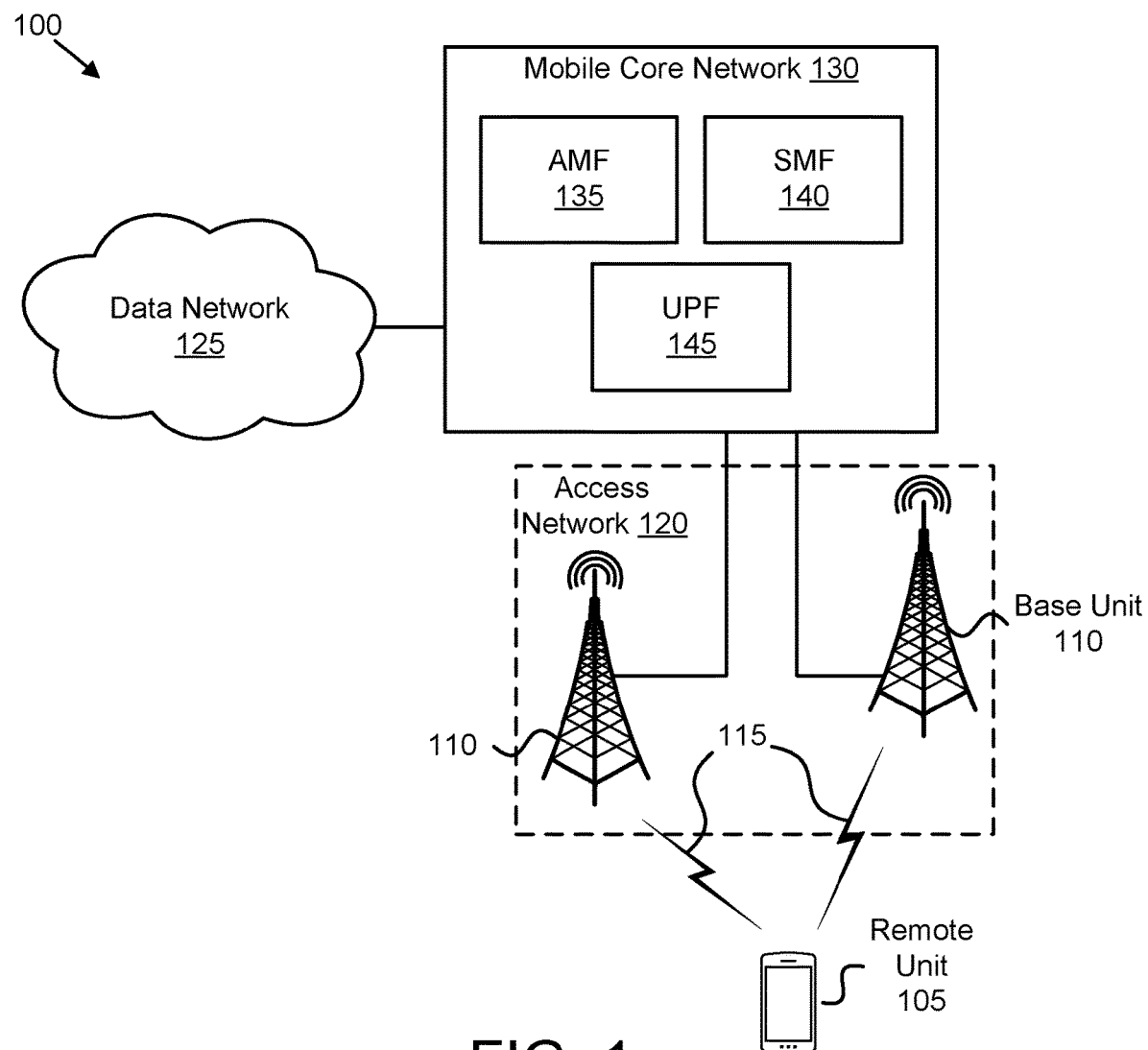
FIG. 1 is a schematic block diagram illustrating one embodiment of a wireless communication system for communicating a short-duration uplink channel.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of" any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In a wireless communication system, a slot can be defined as a time unit which consists of one or more symbols, e.g., orthogonal frequency division multiplexing ("OFDM") or discrete Fourier transform-spread-OFDM ("DFT-S-OFDM") symbols. A transmission time interval ("TTI") refers to the duration in which the UE can receive/transmit a transport block ("TB") from higher layers. In fifth generation ("5G") radio access technology ("RAT"), multiple TTIs within a slot or concatenated slots, flexible timing relationship between scheduling grant signaling and actual transmission/reception, and flexible hybrid automatic repeat request-acknowledgement ("HARQ-ACK") feedback timing may need to be supported, considering various services requirements (e.g., latency, reliability, data rate), UE types, deployment scenarios (e.g., unlicensed bands), and power-efficient UE operation (e.g., operating bandwidth adaptation), etc. As used herein, "HARQ-ACK" may represent collectively the Positive Acknowledge ("ACK") and the Negative Acknowledge ("NACK") and Discontinuous Transmission ("DTX"). ACK means that a TB is correctly received while NACK means a TB is erroneously received and DTX means that no TB was detected.

For low-latency operation, a user equipment ("UE") may perform downlink ("DL") reception and corresponding HARQ-ACK feedback transmission, or reception of an uplink ("UL") scheduling grant and corresponding UL transmission within a slot duration (so called, self-contained operation). To enable this in Time Division Duplex ("TDD") systems, a low-latency slot (also referred to as a "self-contained" slot) which consists of DL transmission, guard, and UL transmission regions may be defined. In addition, for both Frequency Division Duplex ("FDD") and TDD, DL physical control channels (e.g., PDCCH) may be placed in a front part of the slot, and uplink physical control channels (e.g., PUCCH) may be placed in a last part of the slot.

Disclosed herein are methods to enable low-latency communication with low guard period ("GP") overhead, to multiplex physical channels for supporting communications with various latency requirements concurrently (e.g., mixed low-latency traffic and normal traffic), and to use both short physical uplink control channels ("PUCCH") and long PUCCH. As used herein, "short" PUCCH refers to a PUCCH that spans one or two OFDM symbols in the slot. In contrast, a "long" PUCCH refers to a PUCCH that spans more than two symbols of the slot. Generally, the long PUCCH spans the entire slot (just like an LTE PUCCH); however, a long PUCCH may be shorter than the entire slot, e.g., to allow for narrowband retuning in a band-limited UE and/or for transmission of sounding reference signals ("SRS"). A UE may multiplex short PUCCH and long PUCCH based on UE beamforming architectures/hardware capability and deployment scenarios.

FIG. 1 depicts a wireless communication system 100 for communicating a short-duration uplink channel, according to embodiments of the disclosure. In one embodiment, the wireless communication system 100 includes at least one remote unit 105, an access network 120 containing at least one base unit 110, wireless communication links 115, and a mobile core network 130. Even though a specific number of remote units 105, access networks 120, base units 110, wireless communication links 115, and mobile core networks 130 are depicted in FIG. 1, one of skill in the art will recognize that any number of remote units 105, access networks 120, base units 110, wireless communication links 115, and mobile core networks 130 may be included in the wireless communication system 100. In another embodiment, the access network 120 contains one or more WLAN (e.g., Wi-Fi™) access points.

In one implementation, the wireless communication system 100 is compliant with the 5G system specified in the 3GPP specifications (e.g., "5G NR"). More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 130 via the access network 120.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 130 is a 5G core ("5GC") or the evolved packet core ("EPC"), which may be coupled to other data network 125, like the Internet and private data networks, among other data networks. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes an access and mobility management function ("AMF") 135, a session management function ("SMF") 140, and a user plane function ("UPF") 145. Although a specific number of AMFs 135, SMFs 140, and UPFs 145 are depicted in FIG. 1, one of skill in the art will recognize that any number and type of network function may be included in the mobile core network 130.

The AMF 135 provides services such as UE registration, UE connection management, and UE mobility management. The SMF 140 manages the data sessions of the remote units 105, such as a PDU session. The UPF 145 provides user plane (e.g., data) services to the remote units 105. A data connection between the remote unit 105 and a data network 125 is managed by a UPF 145.

The RAN 120 supports two types of UL physical control channels (e.g., PUCCH): a short control channel (e.g., short PUCCH) placed in a last part of a slot (e.g., the final one or two symbol periods of the slot), and a long control channel (e.g., long PUCCH) which spans over the slot. In certain embodiments, the long control channel may occupy less than the entire slot, but more than half the slot duration. Similarly, a short physical uplink data channel (e.g., short PUSCH) may be frequency division multiplexed with the short PUCCH in the same symbol(s). The short PUCCH frequency division multiplexed with short PUSCH is referred to herein as "short PUCCH/PUSCH". Additionally, a long physical data channel (e.g., long PUSCH) may be defined which spans over the slot or a significant portion of the slot duration (e.g., more than two symbols).

The short control channel (e.g., short PUCCH) may be used for transmission of scheduling request ("SR"), a small number of HARQ-ACK bits (e.g., up to 8 bits of HARQ-ACK feedback), and a limited CSI report for non-power limited remote units 105 (e.g., an indication on change of the best DL beam). In contrast, the long control channel (e.g., long PUCCH) is used for transmission of the full CSI report (e.g., the interference measurement and report with multiple interference hypotheses). The long control channel is also used to transmit a larger number of HARQ-ACK bits, e.g., from slot aggregation and/or carrier aggregation. Moreover, the long control channel is used by power-limited remote units 105.

In certain embodiments, the remote units 105 always transmits the short control channel (e.g., short PUCCH or short PUCCH/PUSCH) using an OFDM waveform. In some embodiments, the long PUCCH (or long PUSCH) is transmitted using either an OFDM waveform or a DFT-S-OFDM waveform. Here, a remote unit 105 may be configured by the RAN 120 to use either the OFDM waveform or DFT-S-OFDM waveform when transmitting long PUCCHs or long PUSCHs, for example the waveform being selected based on the cell or TRP measurements, such as the reference signal received power ("RSRP"). In other embodiments, the RAN 120 dynamically indicates to the remote unit 105 whether to use an OFDM waveform or DFT-S-OFDM waveform for long PUCCH (or long PUSCH). Here, the dynamic indication may be an explicit parameter or element in the DCI or may be implicitly signaled to the remote unit 105. Moreover, the waveform used for the long PUCCH/PUSCH may depend on the target TRP, as discussed below with reference to FIG. 3.

For resource allocation of short control channels (e.g., short PUCCHs), the RAN 120 may allocate a set of subcarriers (or a set of resource blocks) as a short PUCCH region. Moreover, the RAN 120 may dynamically indicate in DCI (e.g., indicate with each DCI) the allocated set to the remote unit 105, wherein the remote unit 105 determines the particular resource to use for short PUCCH via implicit signaling. This hybrid approach to determine the short PUCCH resource can reduce the DCI signaling overhead, and yet can provide flexibility in scheduling of long PUCCH/PUSCH. In certain embodiments, the DCI may indicate a specific resource to use for PUCCH from a preconfigured set of resources.

In certain embodiments, the remote unit 105 receives a downlink resource/scheduling assignment message assigning multiple time resource units ("TRUs") and multiple frequency resource units ("FRUs") for data reception. The remote unit 105 then determines a set of transport blocks (TBs) corresponding to the received resource assignment, and determining an ending time resource unit corresponding to each TB of the set of TBs. In one embodiment, the received resource assignment corresponds to a single large TB. In another embodiment, the received resource assignment corresponds to multiple smaller TBs.

The remote unit 105 transmits HARQ-ACK feedback corresponding to each TB in the set of TBs. In some embodiments, the remote unit 105 determines an uplink resource for transmission of the HARQ-ACK at least based on the ending TRU of the corresponding TB and the FRUs of the corresponding TB. In one embodiment, the uplink resource, for example, uplink PRB(s) and/or a sequence(s), used for transmission of the HARQ-ACK is based on the index of the first assigned FRU of the corresponding TB. In certain embodiments, the FRU is resource block comprising 12 subcarriers. Moreover, the TRU may be a slot comprising an integer number of (one or more) OFDM symbols.

In some embodiments, the remote unit 105 receives a higher layer message configuring HARQ-ACK resources and further receives an indication in the DL scheduling/assignment message, wherein the remote unit 105 determines the resource used for transmission of the HARQ-ACK based on the indication and the higher layer message. For example, the indication may signal the remote unit 105 to use a resource identified based on the TRUs and FRUs of the corresponding TB. As another example, the indication may signal the remote unit 105 to use a specific resource of the configured HARQ-ACK resources. In yet another example, the indication may be an offset and may signal the remote unit 105 to use a resource an indicated offset away from the resource identified based on the TRUs and FRUs of the corresponding TB.

In some embodiments, the RAN 120 operates with "paired spectrum" with one carrier dedicated for the downlink and another carrier dedicated for the uplink. In other embodiments, the RAN 120 operates with unpaired spectrum, such that there are no frequencies (e.g., subcarriers) dedicated solely to the downlink and no frequencies/subcarriers dedicated solely to the uplink. In such embodiments, the RAN 120 may employ the entire frequency range of the carrier to downlink communications during a first time period and then employ the entire frequency range of the carrier to uplink communications during a second time period. Moreover, the downlink time period and uplink time period are separated by a guard period, i.e., a time when no communication occur.

In certain embodiments, for a cell with unpaired spectrum, the RAN 120 sets a guard period shorter than the symbol duration of a data channel. Doing so allows the RAN 120 to use the remaining time of the symbol duration of the data channel for transmission/reception of a demodulation reference signal ("DM RS") of the data channel. To make the DM RS of the data channel be transmitted/received with shorter-than-normal duration, the DM RS uses a larger subcarrier spacing than a subcarrier spacing of the data channel. For example, if the normal subcarrier spacing of the data channel is 15 kHz, then the DM RS may be transmitted for half the normal symbol length using a subcarrier spacing of 30 kHz. Moreover, the DM RS may be time division multiplexed with the data channel or with a control channel. Here, the data/control channel may support both OFDM and DFT-S-OFDM waveforms in the uplink. Time division multiplexing of DM RS and data/control channels are described in further detail below, with reference to FIG. 7A-7D.

Figure 2:
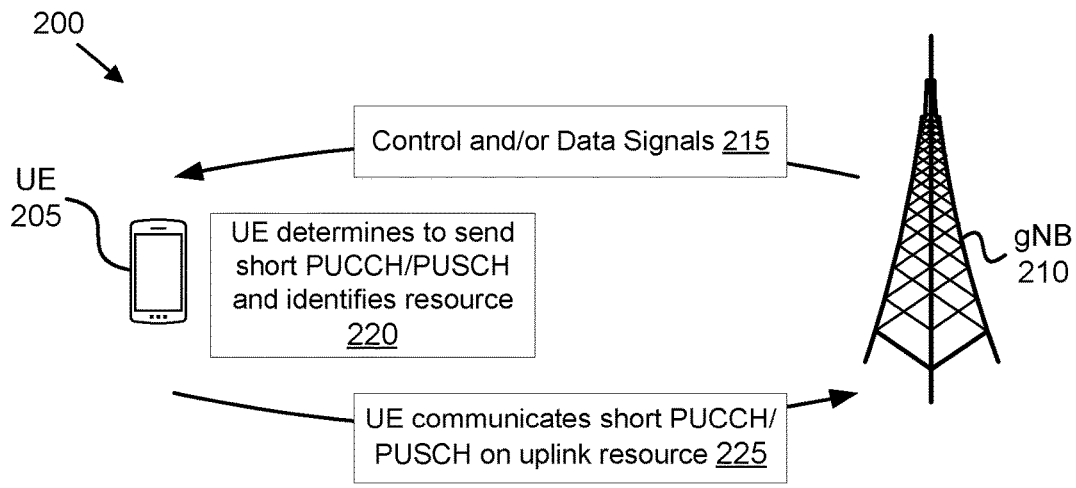
FIG. 2 is a block diagram illustrating one embodiment of a network architecture for communicating a short-duration uplink channel.

FIG. 2 depicts a network architecture 200 used for communicating a short-duration uplink channel, according to embodiments of the disclosure. The network architecture 200 may be a simplified embodiment of the wireless communication system 100. As depicted, the network architecture 200 includes a UE 205 in communication with a gNB 210. The UE 205 may be one embodiment of a remote unit 105 and the gNB 210 may be one embodiment of the base unit 110, described above.

As depicted, the gNB 210 sends, on the downlink, various control and/or data signals to the UE 205 (see block 215). The UE 205 determines to send short PUCCH or short PUCCH/PUSCH and identifies an uplink resource (see block 220). Then UE 205 then transmits a short PUCCH (or short PUCCH multiplexed with short PUSCH, e.g., short PUCCH/PUSCH) on the identified uplink resource. As described above, the gNB 210 may assign an uplink resource to the UE 205 to use in transmitting the short PUCCH or PUCCH/PUSCH. In one embodiment, the gNB 210 assigns the UE 205 an uplink resource when sending a downlink resource assignment message.

Downlink control channel overhead may be reduced by the UE 205 using implicit signaling to identify a slot and resource block(s) to use for short PUCCH or short PUCCH/PUSCH. In such embodiments, the remote unit 105, when given a downlink resource assignment, may determine TBs corresponding to the resource assignment. The remote unit then determines the ending time-resource unit (e.g., symbol) corresponding to each TB. The remote unit 105 transmits its HARQ-ACK feedback at a time based on at least the ending TRU of the TB. In one embodiment, the UE 205 selects an uplink resource, for example, uplink PRBs and/or a sequence(s), for transmitting the HARQ-ACK feedback based on the FRU(s) corresponding to the TB. In another embodiment, the UE 205 selects the uplink resource for transmitting the HARQ-ACK feedback based on indicators in the downlink resource assignment message.

In one embodiment, the gNB 210 configures the UE 205 with a set of HARQ-ACK resources to use with low-latency communications (e.g., for transmitting HARQ-ACK feedback on short PUCCH). For example, the UE 205 may be configured via RRC signaling with the set of HARQ-ACK resources. Thereafter, the UE 205 selects a particular HARQ-ACK resource, choosing from one of the multiple HARQ-ACK resources based on the above criteria, referred to as "implicit determination." In certain embodiments, the gNB 210 may override the implicit determination of HARQ-ACK resources by sending, e.g., in DCI, an indication of a particular HARQ-ACK resource to use.

For example, the gNB 210 may include a two-bit information element or field in DCI, where a value of '00' indicates that the UE 205 is to use the resource indicated by implicit determination, a value of '01' indicates the UE 205 is to use a resource a first offset away from the implicitly determined resource, a value of '10' indicates the UE 205 is to use a resource a second offset away from the implicitly determined resource, and a value of '11' indicates the UE 205 is to use a resource a third offset away from the implicitly determined resource. In other embodiments, the values '01', '10', and '11' may point to specific HARQ-ACK resources, as discussed below with reference to FIG. 9B.

In some embodiments, a mobile communication network may dynamically determine and signal, in slot n, radio resources (e.g., subcarrier allocation) of short PUCCH/PUSCH for slot n, considering other pre-scheduled long PUSCH/PUCCH transmission in slot n. (e.g., the UL data or a full/periodic CSI report). Dynamically adapting short PUCCH/PUSCH resources allows flexible scheduling of long PUSCH/PUCCH and enables efficient resource utilization. In case that there is no DL region in slot n, e.g. UL only slot for non-paired spectrum, subcarrier allocation of short PUCCH/PUSCH for slot n can be indicated in a slot n-k which includes a DL region, is prior to but closest to slot n.

In one embodiment, both short PUCCH and short PUSCH resources for slot n may be dynamically signaled via DCI in slot n (or in slot n-k if there is no DL region in slot n). The resource of short PUCCH for HARQ-ACK feedback may be indicated in DCI scheduling a corresponding DL data channel, if the DL scheduling DCI is transmitted in slot n or slot n-k.

In some embodiments, the UE 205 communicates using a first transmission direction in a first OFDM symbol. Here, the first OFDM symbol corresponds to a first subcarrier spacing value. The UE 205 also communicates using a second transmission direction using a second OFDM symbol. Here, the second OFDM symbol corresponds to a second subcarrier spacing value. Moreover, the second OFDM symbol occurs immediately following a communication gap (e.g., guard period) between the first and second OFDM symbols.

Additionally, the UE 205 communicates using the second transmission direction in a third OFDM symbol. Here, the third OFDM symbol corresponds to the first subcarrier spacing value. Moreover, the third OFDM symbol immediately follows the second OFDM symbol. In certain embodiments, the second subcarrier spacing value is an integer multiple (e.g., twice) of the first subcarrier spacing value.

In one embodiment, the first transmission direction is downlink, and the second transmission direction is uplink. Additionally, the second OFDM symbols may contain a reference signal, and the third OFDM symbol may contain data. In such an embodiment, the UE 205 receives, e.g., downlink data, in the first OFDM symbol, switches to uplink communication (e.g., during the gap period), sends the reference signal in the second OFDM symbol, and transmits, e.g., UCI, in the third OFDM symbol.

In another embodiment, the first transmission direction is uplink, and the second transmission direction is downlink. Additionally, the second OFDM symbols may contain a reference signal, and the third OFDM symbol may contain data. In such an embodiment, the UE 205 transmits, e.g., uplink data, in the first OFDM symbol, switches to downlink communication (e.g., during the gap period), receives the reference signal in the second OFDM symbol, and receives, e.g., DCI, in the third OFDM symbol.

Figure 3:
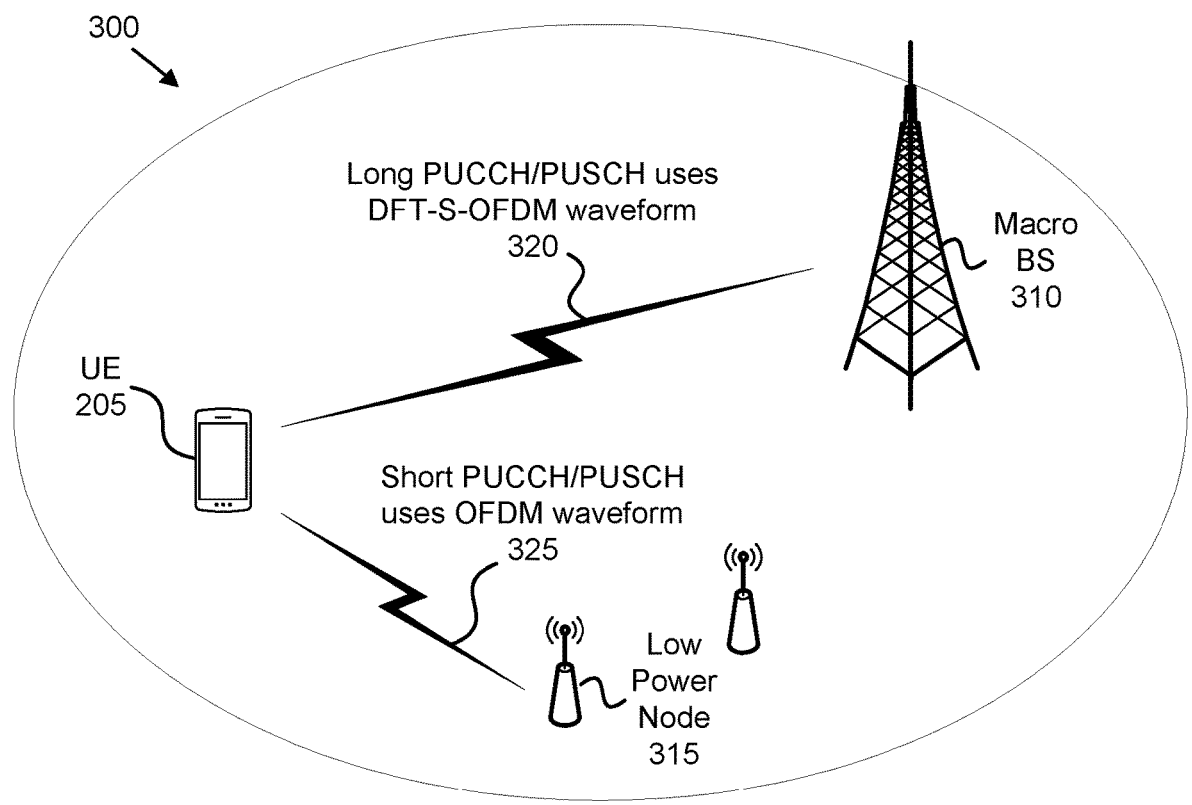
FIG. 3 is a block diagram illustrating one embodiment of a user equipment transmitting uplink control messages to multiple transmission and reception points ("TRPs")

FIG. 3 depicts a network 300 where a UE 205 transmits uplink control messages to multiple TRPs. The network 300 may be one embodiment of the system 100 described above. Here, the UE 205 is concurrently connected to a macro base station ("macro BS") 310 and one or more low-power nodes 315. In this situation, the uplink reception point may be dynamically changed among the macro BS 310 and low-power nodes 315. Here, the macro BS 310 and the low-power nodes 315 may be embodiments of the base units 110. In the depicted embodiment, the UE 205 transmits the long PUCCH/PUSCH 320 using a DFT-S-OFDM waveform. Moreover, the UE transmits the short PUCCH/PUSCH 325 using an OFDM waveform. While the UE 205 is depicted as transmitting the long PUCCH/PUSCH 320 to the macro BS 310 and the short PUCCH/PUSCH 325 to the low power node 315, in other embodiments the UE 205 transmits a long PUCCH/PUSCH to a low-power node 315 and a short PUCCH/PUSCH to the macro BS 310.

From a network (system) perspective, long and short PUCCHs may be multiplexed in a given slot. For a given UE 205, the UE can be configured with using both long and short PUCCHs, unless it is in transmit (Tx) power-limited conditions for all serving TRPs (e.g., for both the macro BS 310 and the low-power nodes 315).

In some embodiments, the UE 205 always transmits the short PUCCH/PUSCH using an OFDM waveform. In certain embodiments, the UE 205 transmits the long PUCCH/PUSCH using either an OFDM waveform or a DFT-S-OFDM waveform. In one embodiment, the UE 205 may be configured (e.g., by higher layer signaling from a network function) to use either a OFDM or DFT-S-OFDM waveform, based on a cell (or TRP) measurement/report, such as reference signal received power. In another embodiment, the UE 205 receives an indication in DCI instructing it to use either the OFDM or DFT-S-OFDM waveform for long PUCCH/PUSCH. Here, the DCI may indicate which waveform to use for long PUCCH/PUSCH using either with an explicit parameter in the DCI or an implicit indication. Moreover, the DCI may dynamically indicate the waveform based on a target TRP of the long PUCCH/PUSCH. In some embodiments, the UE 205 is configured (or signaled) to use the OFDM waveform when transmitting the long uplink control channel to the low-power nodes 315 and to use the DFT-S-OFDM waveform when transmitting the long uplink control channel to the macro BS. In other embodiments, the UE 205 is configured to always use the DFT-S-OFDM waveform when transmitting the long PUCCH/PUSCH.

In some embodiments, the UE 205 may require transmitting both long PUCCH (or long PUSCH) and short PUCCH in the same slot, such that the long PUCCH (or long PUSCH) and the short PUCCH partially overlap in time. For example, the UE 205 may be scheduled with uplink resources to transmit a long PUCCH and may also receive low-latency downlink data requiring it to transmit a short PUCCH with HARQ-ACK feedback.

Depending on the hardware capability of the UE 205 and various network deployment scenarios, the UE 205 may transmit the long PUCCH/PUSCH except during the overlapping time duration and transmit the short PUCCH during the overlapping time duration. Where supported, the UE 205 may instead transmit the long PUCCH/PUSCH including during the overlapping time duration and the short PUCCH during the overlapping time duration. Moreover, the UE 205 may transmit the long PUCCH/PUSCH and the short PUCCH with different transmit beamforming weights, as discussed further below with reference to FIG. 6.

Figure 4:
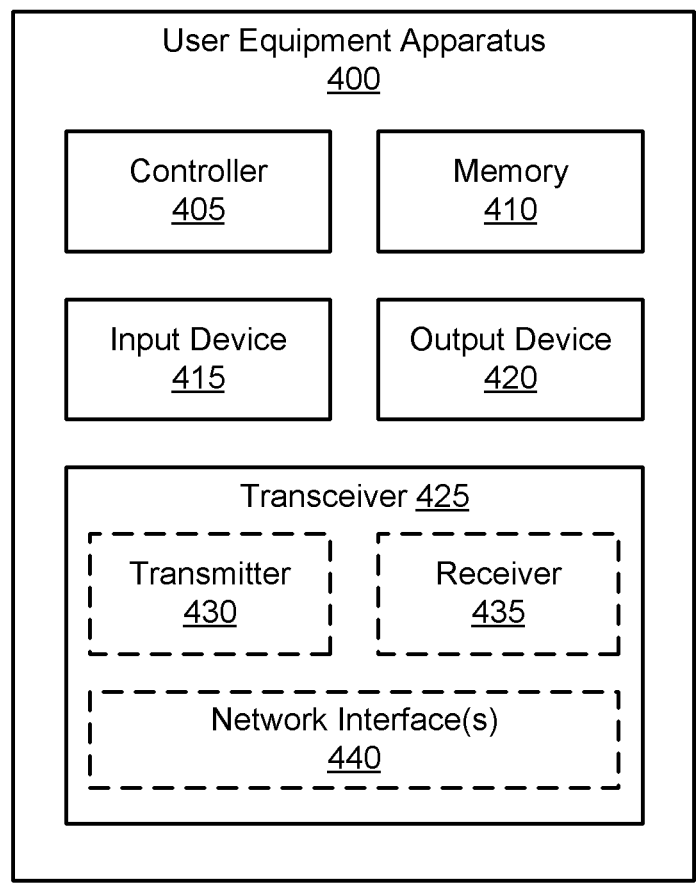
FIG. 4 is a schematic block diagram illustrating one embodiment of a user equipment apparatus for communicating a short-duration uplink channel.

FIG. 4 depicts one embodiment of a user equipment apparatus 400 that may be used for communicating a short-duration uplink channel, according to embodiments of the disclosure. The user equipment apparatus 400 may be one embodiment of the remote unit 105 and/or UE 205. Furthermore, the user equipment apparatus 400 may include a processor 405, a memory 410, an input device 415, a display 420, and a transceiver 425. In some embodiments, the input device 415 and the display 420 are combined into a single device, such as a touch screen. In certain embodiments, the user equipment apparatus 400 may not include any input device 415 and/or display 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the transceiver 425 receives a downlink scheduling assignment message from a base unit 110 in a mobile communication network (e.g., the system 100), the message assigning resources for data reception of a TB. In response to the downlink scheduling assignment, the processor 405 may identify a set of uplink resources allocated for a short uplink control channel in the slot. Moreover, the processor 405 determines a first uplink resource from within the set of uplink resources based on the downlink scheduling assignment message.

In one embodiment, the processor 405 determines the first uplink resource using a RB index of a first assigned FRU of the TB. In another embodiment, the processor 405 determines the first uplink resource using a lowest CCE index of the downlink scheduling assignment message. In a third embodiment, the processor 405 determines the first uplink resource using a HARQ-ACK feedback delay of the apparatus. In a fourth embodiment, the processor 405 determines the first uplink resource using a HARQ-ACK resource index or offset indicated in the downlink scheduling assignment message.

Having determined the first uplink resource, the processor 405 controls the transceiver 425 to transmit a first uplink channel on the first uplink resource, the first uplink channel conveying HARQ-ACK feedback for the TB. In certain embodiments, the TB is received in the same slot as the first uplink resource. Here, the transceiver 425 further receives DCI indicating the set of resources allocated for the first uplink channel. In such embodiments, receiving the DCI includes receiving common DCI in a common control region of the slot.

In some embodiments, the transceiver 425 receives scheduling information to transmit a second uplink channel on a second uplink resource in the slot, wherein the first uplink resource and the second uplink resource at least partially overlap in the time domain. Here, the second uplink resource is larger than the first uplink resource in the time domain. In such embodiments, the processor 405 controls the transceiver 425 to transmit the first and second uplink channels, including transmitting at least the first uplink channel during the overlap time. In some embodiments, the processor 405 controls the transceiver 425 multiplex the first uplink channel into the second uplink channel. In one embodiment, transmitting the first and second uplink channels includes transmitting the first uplink channel with an OFDM waveform and transmitting the second uplink channel with a DFT-S-OFDM waveform.

In certain embodiments, transmitting the first and second uplink channels includes transmitting the second uplink channel on the second uplink resource except during the overlap time. For example, the transceiver 425 may only support a single transmit beamforming weight at a given time instance. In this scenario, transmitting the first and second uplink channels includes transmitting the first uplink channel and the second uplink channel with different transmit beamforming weights.

In certain embodiments, transmitting the first and second uplink channels includes transmitting the second uplink channel during the overlap time. For example, the transceiver 425 may support more than one transmit beamforming weights at a given time instance. In this scenario, transmitting the first and second uplink channels includes transmitting the first uplink channel is transmitted with a first transmit beamforming weight and transmitting the second uplink channel is transmitted with a second transmit beamforming weight. As another example, the transceiver 425 may only support a single transmit beamforming weight at a given time instance, but the first uplink channel is transmitted with a same transmit beamforming weight as the second uplink channel. In one embodiment, the first and second uplink channels are transmitted with an OFDM waveform.

In some embodiments, the processor 405 determines a time-domain resource of the first uplink resource based on at least an ending TRU of the TB. In certain embodiments, identifying the set of uplink resources allocated for the first uplink channel in the slot may include receiving a higher layer message configuring a set of HARQ-ACK resources and identifying a HARQ-ACK resource index indicated in the downlink scheduling assignment message. Here, the HARQ-ACK resource index indicates a specific one of the configured HARQ-ACK resources.

In certain embodiments, the resources for data reception include multiple TRUs and multiple FRUs corresponding to multiple TBs. Here, the processor 405 determines an uplink resource for each TB in response to receiving the TB and controls the transceiver 425 to send HARQ-ACK feedback in the first uplink channel. Moreover, the processor 405 may determine and send HARQ-ACK feedback for at least one TB prior to receiving all TBs in the downlink resource assignment. In one embodiment, the TRU is a slot including an integer number of OFDM symbols and the FRU is a resource block including 12 subcarriers.

In various embodiments, the processor 405 controls the transceiver 425 to communicate a first channel using a first transmission direction in a first OFDM symbol, communicate a second channel using a second transmission direction in a second OFDM symbol, and communicate a third channel using the second transmission direction in a third OFDM symbol. In such embodiments, the first channel and third channel are transmitted with a first subcarrier spacing value and the second channel is transmitted with a second subcarrier spacing value greater than the first subcarrier spacing value. In some embodiments, the second subcarrier spacing value is an integer multiple of the first subcarrier spacing value. Moreover, the third OFDM symbol occurs immediately follows the second OFDM symbol and the second OFDM symbol occurs immediately following a communication gap between the first and second OFDM symbols.

In certain embodiments, the second channel includes a reference signal and the third channel contains data. In one embodiment, the first transmission direction is downlink, and the second transmission direction is uplink. Here, communicating the first channel includes receiving the TB and communicating the third channel includes transmitting the HARQ-ACK feedback. In one embodiment, the first transmission direction is uplink, and the second transmission direction is downlink. Here, communicating the third channel includes receiving the TB immediately following the reference signal.

In various embodiments, the processor 405 receives first scheduling information to transmit a first uplink channel on a first uplink resource in a slot and receives second scheduling information to transmit a second uplink channel on a second uplink resource in the slot. Here, the first uplink resource and the second uplink resource at least partially overlap in the time domain. Additionally, the first scheduling information is received later than the second scheduling information and the second uplink resource is larger than the first uplink resource in the time domain.

The processor 405 controls the transceiver 425 to transmit the first uplink channel and second uplink channel, including transmitting the first uplink channel on the first uplink resource including the overlap time and transmitting a part of the second uplink channel on a part of the second uplink resource excluding at least the overlap time.

In some embodiments, the first uplink channel carries at least one of low-latency data and low-latency control information. In some embodiments, the first uplink channel contains one or two symbols in the slot. In some embodiments, the first method further includes receiving a higher layer message configuring waveforms for the first and second uplink channels, respectively and transmitting the first and second uplink channels with the respective configured waveforms. In one embodiment, the user equipment apparatus 400 may be configured by higher layer signaling to use an OFDM waveform. In another embodiment, the user equipment apparatus 400 may be configured by higher layer signaling to use a DFT-S-OFDM waveform.

In some embodiments, receiving the first scheduling information to transmit the first uplink channel in the slot includes receiving a downlink scheduling assignment message assigning resources for data reception of a TB and identifying the first uplink resource for the first uplink channel in the slot, the first uplink channel conveying HARQ-ACK feedback for the TB. In certain embodiments, the first uplink channel is a PUCCH. In such embodiments, identifying the first uplink resource for the first uplink channel in the slot further includes: receiving a higher layer message configuring a set of PUCCH resources, determining the slot based on an ending slot of the TB, and determining the first uplink resource from the set of PUCCH resources based on DCI, including the downlink scheduling assignment message and the lowest CCE index of the DCI.

In some embodiments, the user equipment apparatus 400 supports a transmission with a single transmit antenna panel at a given time instance. In certain embodiments, transmitting the first and second uplink channels includes transmitting the first uplink channel and the second uplink channel with different transmit antenna panels.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data relating to communicating a short-duration uplink channel. For example, the memory 410 may store sets of candidate resources for PUCCH, HARQ-ACK feedback, downlink scheduling assignments, downlink control information, and the like. In certain embodiments, the memory 410 also stores program code and related data, such as an operating system or other controller algorithms operating on the user equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 communicates with one or more base units 110 in a mobile communication network. Via a base unit 110, the transceiver 425 may communicate with one or more network functions in the mobile communication network. The transceiver 425 operates under the control of the processor 405 to transmit messages, data, and other signals and also to receive messages, data, and other signals. For example, the processor 405 may selectively activate the transceiver 425 (or portions thereof) at particular times in order to send and receive messages.

The transceiver 425 may include one or more transmitters 430 and one or more receivers 435. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. In certain embodiments, the transceiver 425 includes multiple RF chains and/or multiple antenna panels.

Additionally, the transceiver 425 may support at least one network interface 440. Here, the at least one network interface 440 facilitates communication with a RAN node, such as an eNB or gNB, for example using the "Uu" interface. Additionally, the at least one network interface 440 may include an interface used for communications with one or more network functions in the mobile core network, such as a UPF, an AMF, and/or a SMF.

In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an application-specific integrated circuit ("ASIC"), or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
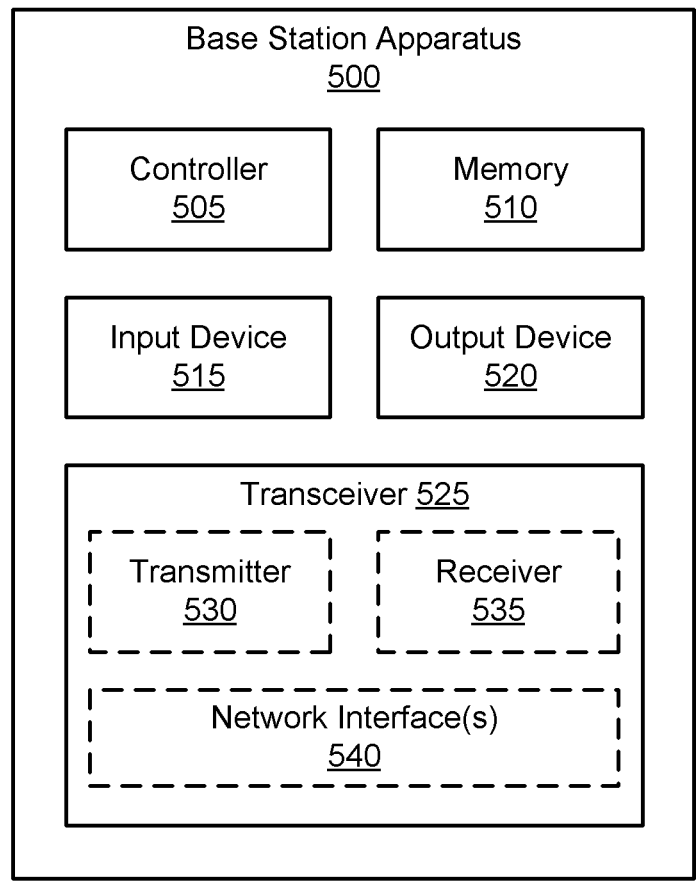
FIG. 5 is a schematic block diagram illustrating one embodiment of a base station apparatus for communicating a short-duration uplink channel.

FIG. 5 depicts one embodiment of a base station apparatus 500 that may be used for communicating a short-duration uplink channel, according to embodiments of the disclosure. The base station apparatus 500 may be one embodiment of the base unit 110 and/or gNB 210. Furthermore, the base station apparatus 500 may include a processor 505, a memory 510, an input device 515, a display 520, and a transceiver 525. In some embodiments, the input device 515 and the display 520 are combined into a single device, such as a touch screen. In certain embodiments, the base station apparatus 500 may not include any input device 515 and/or display 520.

The processor 505, in one embodiment, may include any known controller capable of executing computer-readable instructions and/or capable of performing logical operations. For example, the processor 505 may be a microcontroller, a microprocessor, a CPU, a GPU, an auxiliary processing unit, a FPGA, or similar programmable controller. In some embodiments, the processor 505 executes instructions stored in the memory 510 to perform the methods and routines described herein. The processor 505 is communicatively coupled to the memory 510, the input device 515, the display 520, and the transceiver 525.

In some embodiments, the transceiver 525 sends a downlink scheduling assignment message to a remote unit 105 in a mobile communication network, the message assigning resources for data reception of a TB. Moreover, the processor 505 may control the transceiver to indicate, to the remote unit 105, a set of uplink resources allocated for a first uplink channel in the slot. Here, the first uplink channel may be a short uplink channel consisting of one or two symbols in the slot (e.g., the last one or two symbols in the slot).

In one embodiment, the downlink scheduling assignment message includes an indicator of a particular one of the uplink resources the remote unit 105 is to use for the first uplink channel. In another embodiment, the properties of the downlink resource assignment implicitly indicate a particular one of the uplink resources the remote unit 105 is to use for the short uplink control channel. Accordingly, the remote unit 105 determines a first uplink resource from within the set of uplink resources based on the downlink scheduling assignment message.

In one embodiment, the first uplink resource is indicated using a RB index of a first assigned FRU of the TB. In another embodiment, the first uplink resource is indicated using a lowest CCE index of the downlink scheduling assignment message. In a third embodiment, the first uplink resource is indicated using a HARQ-ACK feedback delay of the apparatus. In a fourth embodiment, the first uplink resource is indicated using a HARQ-ACK resource index or offset indicated in the downlink scheduling assignment message.

Additionally, the processor 505 controls the transceiver 525 to receive a first uplink channel on the first uplink resource, the first uplink channel conveying at least HARQ-ACK feedback for the TB. In certain embodiments, the TB is transmitted in the same slot as the first uplink resource. Here, the transceiver 525 further transmits DCI indicating the set of resources allocated for the first uplink channel. In such embodiments, transmitting the DCI includes transmitting common DCI in a common control region of the slot.

In some embodiments, the transceiver 525 transmits scheduling information to the remote unit 105 for transmitting (by the remote unit 105) a second uplink channel on a second uplink resource in the slot, but where the first uplink resource and the second uplink resource at least partially overlap in the time domain. Here, the second uplink resource is larger than the first uplink resource in the time domain. In such embodiments, the processor 505 controls the transceiver 525 to receive the first and second uplink channels, including receiving at least the first uplink channel during the overlap time.

In some embodiments, the remote unit 105 multiplexes the first uplink channel into the second uplink channel, wherein the transceiver 525 receives the multiplexed channel. In one embodiment, receiving the first and second uplink channels includes receiving the first uplink channel with an OFDM waveform and receiving the second uplink channel with a DFT-S-OFDM waveform.

In certain embodiments, transmitting the first and second uplink channels includes receiving the second uplink channel on the second uplink resource except during the overlap time. For example, the remote unit 105 may only support a single transmit beamforming weight at a given time instance, wherein the first uplink channel and second uplink channel require different transmit beamforming weights. In other embodiments, receiving the first and second uplink channels includes receiving the second uplink channel during the overlap time. For example, the first uplink channel may require the same transmit beamforming weight as the second uplink channel (e.g., the first and second uplink channels may be for the same TRP). In one embodiment, the first and second uplink channels are transmitted with an OFDM waveform.

In some embodiments, the processor 505 controls the transceiver 525 to send a higher layer message to the remote unit 105 configuring a set of HARQ-ACK resources. Moreover, the processor 505 controls the transceiver 525 to indicate a HARQ-ACK resource index in the downlink scheduling assignment message. Here, the HARQ-ACK resource index indicates a specific one of the configured HARQ-ACK resources for the remote unit 105 to use as the first uplink resource.

In certain embodiments, the resources for data reception (by the remote unit 105) include multiple TRUs and multiple FRUs corresponding to multiple TBs. Here, the transceiver 525 receives an uplink resource for each TB, each uplink resource used to communicate HARQ-ACK feedback in the first uplink channel. Moreover, the transceiver 525 may receive HARQ-ACK feedback for at least one TB prior to transmitting all TBs in the downlink resource assignment. In one embodiment, the TRU is a slot including an integer number of OFDM symbols and the FRU is a resource block including 12 subcarriers.

In various embodiments, the processor 505 controls the transceiver 525 to communicate a first channel using a first transmission direction in a first OFDM symbol, communicate a second channel using a second transmission direction in a second OFDM symbol, and communicate a third channel using the second transmission direction in a third OFDM symbol. In such embodiments, the first channel and third channel are transmitted with a first subcarrier spacing value and the second channel is transmitted with a second subcarrier spacing value greater than the first subcarrier spacing value. In some embodiments, the second subcarrier spacing value is an integer multiple of the first subcarrier spacing value. Moreover, the third OFDM symbol occurs immediately follows the second OFDM symbol and the second OFDM symbol occurs immediately following a communication gap between the first and second OFDM symbols.

In certain embodiments, the second channel includes a reference signal and the third channel contains data. In one embodiment, the first transmission direction is downlink, and the second transmission direction is uplink. Here, communicating the first channel includes transmitting the TB and communicating the third channel includes receiving HARQ-ACK feedback for the TB. In one embodiment, the first transmission direction is uplink, and the second transmission direction is downlink. Here, communicating the third channel includes transmitting the TB immediately following the reference signal.

The memory 510, in one embodiment, is a computer readable storage medium. In some embodiments, the memory 510 includes volatile computer storage media. For example, the memory 510 may include a RAM, including DRAM, SDRAM, and/or SRAM. In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data relating to communicating a short-duration uplink channel. For example, the memory 510 may store sets of candidate resources for PUCCH, HARQ-ACK feedback, downlink scheduling assignments, downlink control information, and the like. In certain embodiments, the memory 510 also stores program code and related data, such as an operating system or other controller algorithms operating on the base station apparatus 500 and one or more software applications.

The input device 515, in one embodiment, may include any known computer input device including a touch panel, a button, a keyboard, a stylus, a microphone, or the like. In some embodiments, the input device 515 may be integrated with the display 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The display 520, in one embodiment, may include any known electronically controllable display or display device. The display 520 may be designed to output visual, audible, and/or haptic signals. In some embodiments, the display 520 includes an electronic display capable of outputting visual data to a user. For example, the display 520 may include, but is not limited to, an LCD display, an LED display, an OLED display, a projector, or similar display device capable of outputting images, text, or the like to a user. As another, non-limiting, example, the display 520 may include a wearable display such as a smart watch, smart glasses, a heads-up display, or the like. Further, the display 520 may be a component of a smart phone, a personal digital assistant, a television, a table computer, a notebook (laptop) computer, a personal computer, or the like.

In certain embodiments, the display 520 includes one or more speakers for producing sound. For example, the display 520 may produce an audible alert or notification (e.g., a beep or chime). In some embodiments, the display 520 includes one or more haptic devices for producing vibrations, motion, or other haptic feedback. In some embodiments, all or portions of the display 520 may be integrated with the input device 515. For example, the input device 515 and display 520 may form a touchscreen or similar touch-sensitive display. In other embodiments, the display 520 may be located near the input device 515.

The transceiver 525 communicates with one or more remote units in a mobile communication network. The transceiver 525 may also communicate with one or more network functions in the mobile communication network.

The transceiver 525 operates under the control of the processor 505 to transmit messages, data, and other signals and also to receive messages, data, and other signals. For example, the processor 505 may selectively activate the transceiver (or portions thereof) at particular times in order to send and receive messages. As depicted, the transceiver 525 may include one or more transmitters 530 and one or more receivers 535. Additionally, the transceiver 525 may support one or more network interfaces 540 for communicating with a remote unit 105 and/or with the mobile core network 130.

Figure 6:
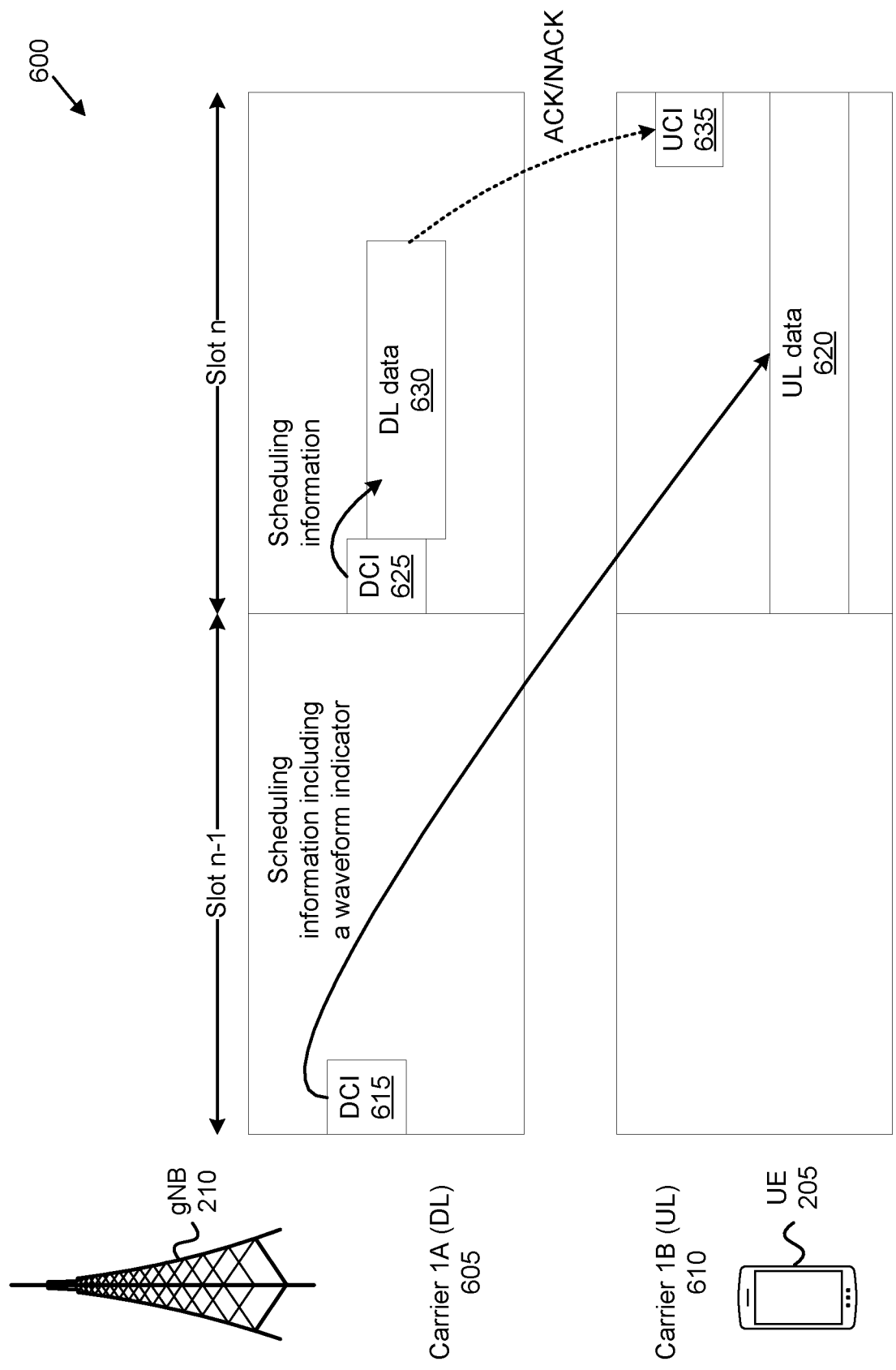
FIG. 6 is a block diagram illustrating one embodiment of communication between a gNB and a UE, with the UE transmitting a short-duration uplink channel.

FIG. 6 depicts communication 600 between a gNB 210 and a UE 205, with the UE 205 transmitting a short-duration uplink channel. Here, the system uses paired spectrum (e.g., FDD) comprising a downlink carrier 605 (labeled "Carrier 1A") and an uplink carrier 610 (labeled "Carrier 1B"). Here, the gNB 210 transmits (and the UE 205 receives) downlink signals (including downlink control channels and downlink data channels) over the downlink carrier 605 and the UE 205 transmits (and the gNB 210 receives) uplink signals (including uplink control channels and uplink data channels) over the uplink carrier 610.

As depicted, the gNB 210 transmits downlink control information ("DCI") 615 in slot n−1 that includes scheduling information. Here, the DCI 615 schedules the UE 205 with a long PUSCH in slot n (e.g., for transmission of uplink data 620). In some embodiments, this scheduling information includes a waveform indicator for the long PUSCH. However, due to arrival of urgent/time-critical/low-latency DL data 630 for the UE 205 (as indicated in the DCI 625 of slot n), the network schedules in slot n low-latency DL data reception with HARQ-ACK feedback transmission expected to occur in a last portion of the slot n (e.g., the last one or two symbols of slot n). Note that in other embodiments the UE 205 may be expected to transmit its full/periodic CSI report using long PUCCH in slot n (e.g., as semi-statically configured via higher layer signaling). In any case, the long PUSCH (or long PUCCH) and the short PUCCH in slot n partially overlap in time.

The UE 205 transmits the short PUCCH (e.g., containing the UCI 635) in slot n at the expected location. Depending on the hardware capability of the UE 205 and network deployment scenarios, the UE 205 may optionally transmit long PUSCH (or long PUCCH) during the overlap time. Note that the UCI 635 contains the HARQ-ACK feedback for the downlink data 630.

In a first embodiment, the UCI 635 for the short PUCCH is intended for a first TRP (e.g., the low-power node 315) and the long PUSCH (or long PUCCH) is intended for a different TRP (e.g., the macro BS 310), the different TRPs requiring different Tx beam directions (e.g., different beamforming weights). In this scenario assume that the UE 205 is only capable of transmitting signals in one beam direction at a time, e.g., due to one radio frequency (RF) chain with one antenna panel, or two RF chains corresponding to dual polarization with one antenna panel, where each RF chain (a chain composed by RF devices like transmitters, receivers, cables, amplifiers, attenuators, analog-to-digital converters, loads, etc.) is connected to antenna elements with common polarization direction.

In this embodiment, the UE 205 does not transmit the symbol(s) of the long PUSCH/PUCCH which overlaps with the short PUCCH, but instead transmits the short PUCCH during the overlap time. In some embodiments, the UE 205 may not transmit one or more symbols of the long PUSCH/PUCCH which occur prior to the overlaps with the short PUCCH, in addition to the symbol(s) of the long PUSCH/PUCCH which overlaps with the short PUCCH. In some embodiments, the target TRP for the long PUSCH/PUCCH (e.g., the macro BS 310) may or may not know existence of the punctured symbol(s), depending on coordination level among the TRPs. Even if the target TRP for the long PUSCH/PUCCH does not know existence of the co-scheduled short PUCCH for the UE 205, a TRP receiver can blindly detect the punctured symbol(s).

In a second embodiment, the UCI 635 for the short PUCCH and the long PUSCH (or long PUCCH) are again intended for different TRPs with different Tx beam directions, respectively (e.g., different beamforming weights). However, in this scenario assume that the UE 205 is able to transmit signals with more than one beam direction at a time based on more than one antenna panel and/or associated more than one RF chain. Two or more RF chains may be capable of forming beams in different directions.

In this second embodiment, the UE 205 transmits both the long PUSCH/PUCCH and the short PUCCH as scheduled, irrespective of the configured waveform of the long PUSCH/PUCCH. In one embodiment, as each antenna panel has its own power amplifiers (e.g., combined with antenna elements), simultaneous transmission of DFT-S-OFDM and OFDM waveforms from different antenna panels does not degrade peak-to-average power ratio ("PAPR") performance of the DFT-S-OFDM waveform.

In a third embodiment, the UCI 635 for the short PUCCH and the long PUSCH/PUCCH are intended for a common TRP (e.g., the macro BS 310) with the same Tx beam direction (e.g., using the same beamforming weight). Moreover, assume that in this scenario the DCI 615 indicated that the long PUSCH/PUCCH is to be transmitted with DFT-S-OFDM.

Because it is not desirable for the UE 205 to transmit the OFDM-based short PUCCH and the DFT-S-OFDM-based long PUSCH/PUCCH simultaneously on an overlapped symbol(s) (due to PAPR degradation), the UE 205 multiplexes the UCI 635 for the short PUCCH into the long PUSCH/PUCCH. Moreover, the UE 205 performs rate-matching or puncturing for the long PUSCH/PUCCH around the last symbol(s) corresponding to the short PUCCH to multiplex the UCI 635. In an alternative scenario, the UE 205 does not transmit the symbol(s) of long PUSCH/PUCCH which overlap with the short PUCCH, but only transmits the short PUCCH during the overlap time.

In a fourth embodiment, the UCI 635 for the short PUCCH and the long PUSCH/PUCCH are again intended to a common TRP with the same Tx beam direction (e.g., using the same beamforming weight). Moreover, assume that in this scenario the DCI 615 indicated that the long PUSCH/PUCCH is to be transmitted with an OFDM waveform. Here, the UE 205 transmits both the long PUSCH/PUCCH and the short PUCCH as scheduled.

The UE 205 operation described in the above is also applicable when both long PUSCH (or long PUCCH) and short PUSCH transmissions are scheduled/expected within a slot. In one embodiment, both short PUCCH and short PUSCH resources for slot n may be dynamically signaled via DCI 625 in slot n. In one embodiment, the resource of short PUCCH for HARQ-ACK feedback may be indicated in the DCI 625 scheduling a corresponding DL data channel (e.g., downlink data 630), if the DL scheduling DCI is transmitted in slot n.

In another embodiment, a set of subcarriers (or a set of resource blocks) allocated as a short PUCCH region for slot n are indicated dynamically via DCI, and subcarriers used for each short PUCCH within the set of allocated subcarriers is implicitly determined, e.g., based on combination of the lowest control channel element ("CCE") index of the DCI 625 scheduling a corresponding DL data channel and a HARQ-ACK feedback delay. This hybrid approach to determine the short PUCCH resource reduces the DCI signaling overhead, and yet provides flexibility in scheduling of long PUCCH/PUSCH.

In certain embodiments, the network identifies the shortage of available subcarriers for short PUSCH/PUCCH in slot n. Here, the network may reassign some of subcarriers scheduled for long PUSCH/PUCCH as a part of short PUCCH region or short PUSCH, and indicates shortened (i.e. by 1-2 symbols) long PUSCH/PUCCH transmission to the affected UEs via DCI in slot n or slot n−1. Accordingly, the UEs receiving the indication of truncated long PUSCH/PUCCH do not transmit on the symbols reassigned to (e.g., overlapped with) short PUCCH/PUSCH in slot n.

FIG. 7A-7D depict various examples of slot resource usage for non-paired spectrum (e.g., TDD). Here, each physical channel carrying DCI, UCI, DL data, or UL data may have a separate demodulation reference signal ("DM RS") 702. In one embodiment, frequency division multiplexed (FDM) DM RS are used for demodulation of DCI and short PUCCH/PUSCH/DL data channel. Here, the short PUCCH/PUSCH/DL data channels are always transmitted with an OFDM waveform. In this embodiment, time division multiplexed (TDM) DM RS are used for long PUSCH, which can be transmitted with either an OFDM or DFT-S-OFDM waveform, as discussed above. In another embodiment, TDM DM RS are employed for all physical channels irrespective of the waveform used.

Figure 7A:
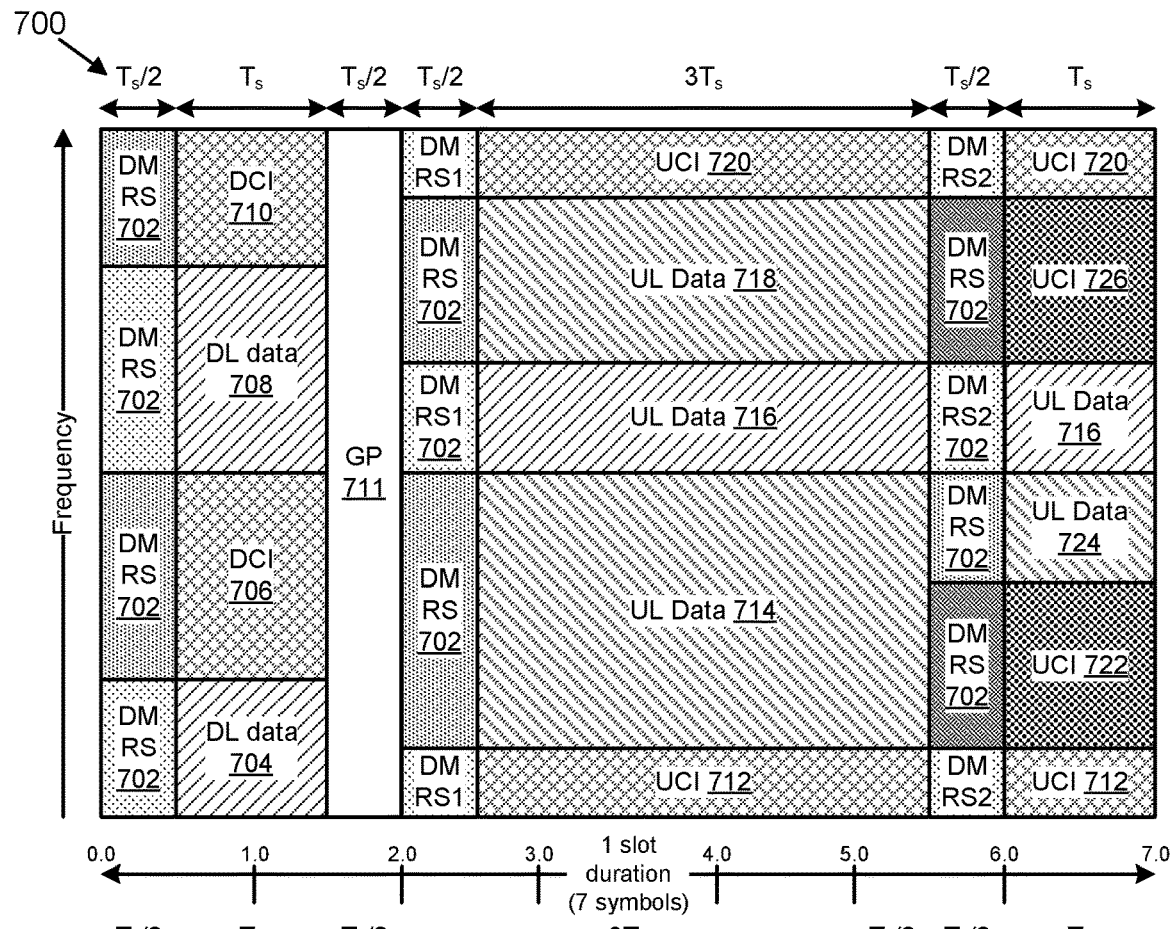
FIG. 7A is a block diagram illustrating embodiments of reference signals time-division multiplexed with corresponding data channels or control channels.
Figure 7A:
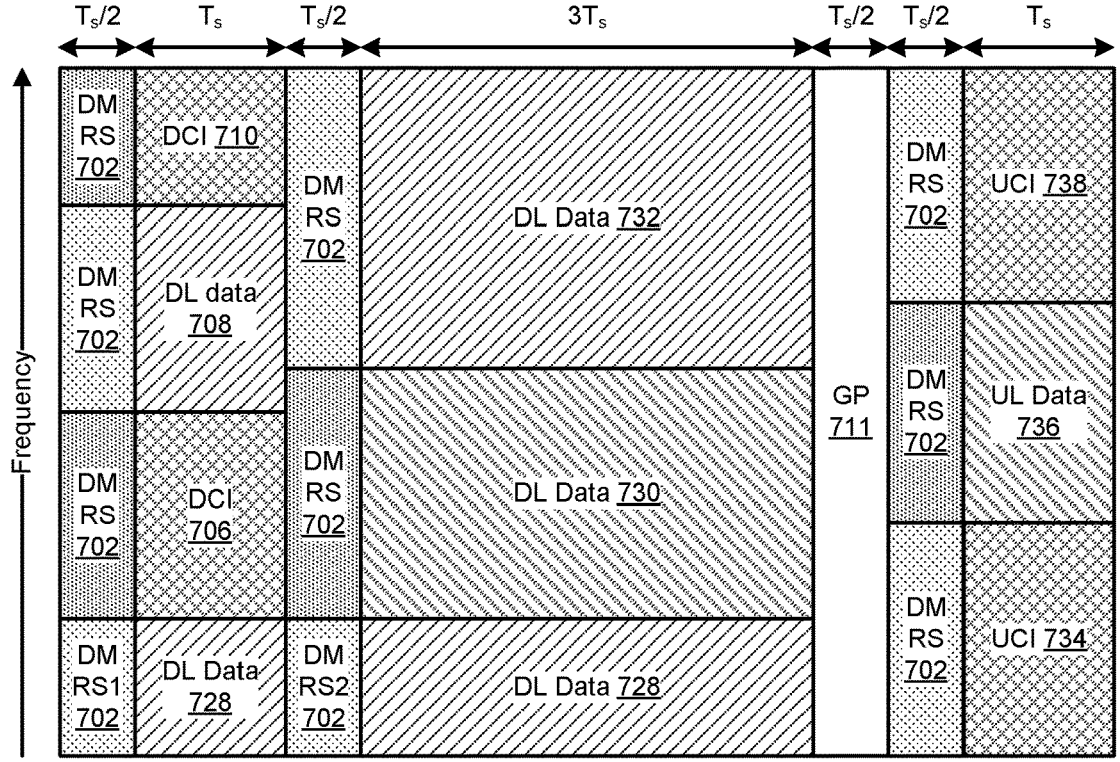
Figure 7B:
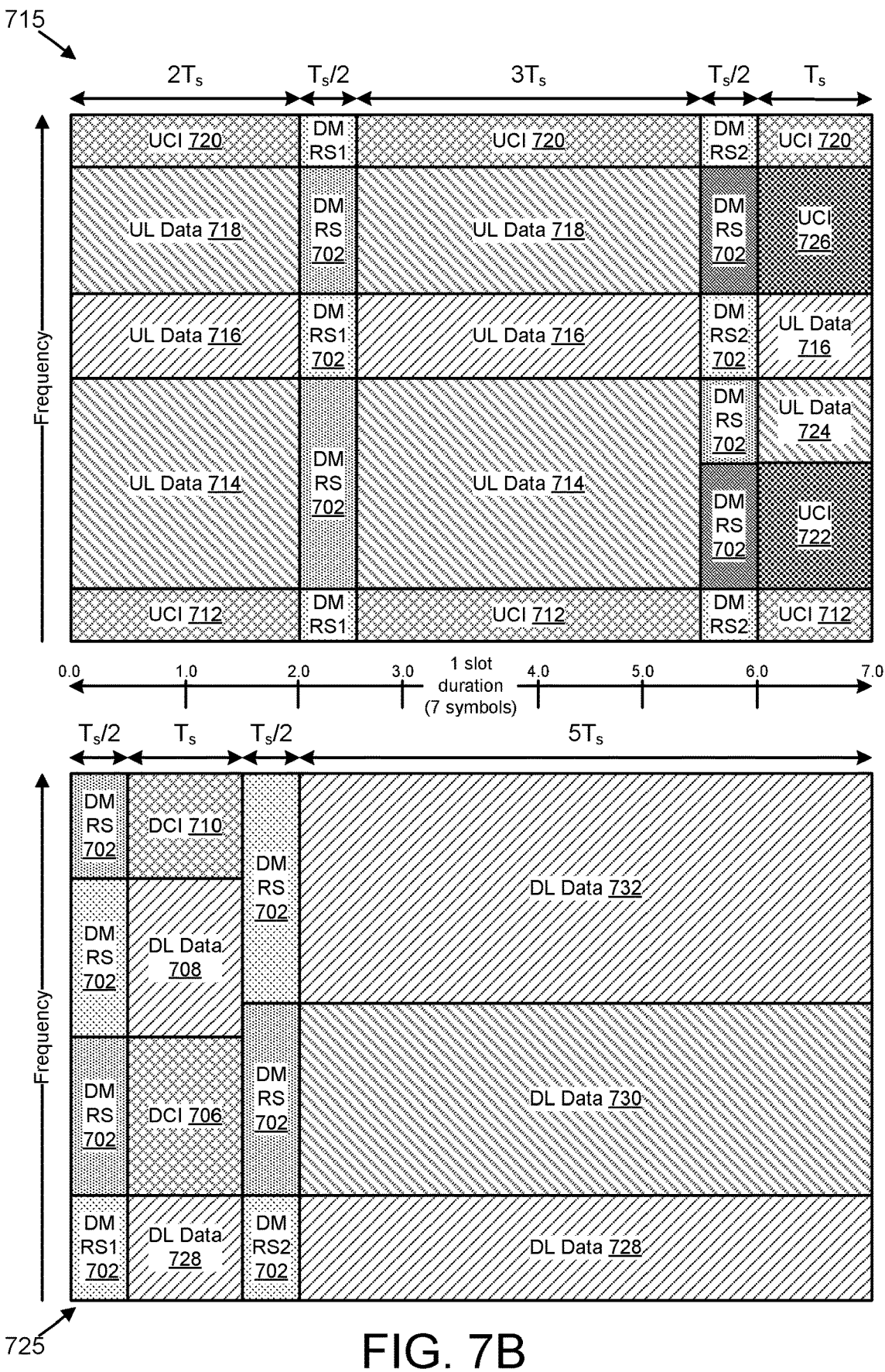
FIG. 7B is a block diagram illustrating more embodiments of reference signals time-division multiplexed with corresponding data channels or control channels.
Figure 7C:
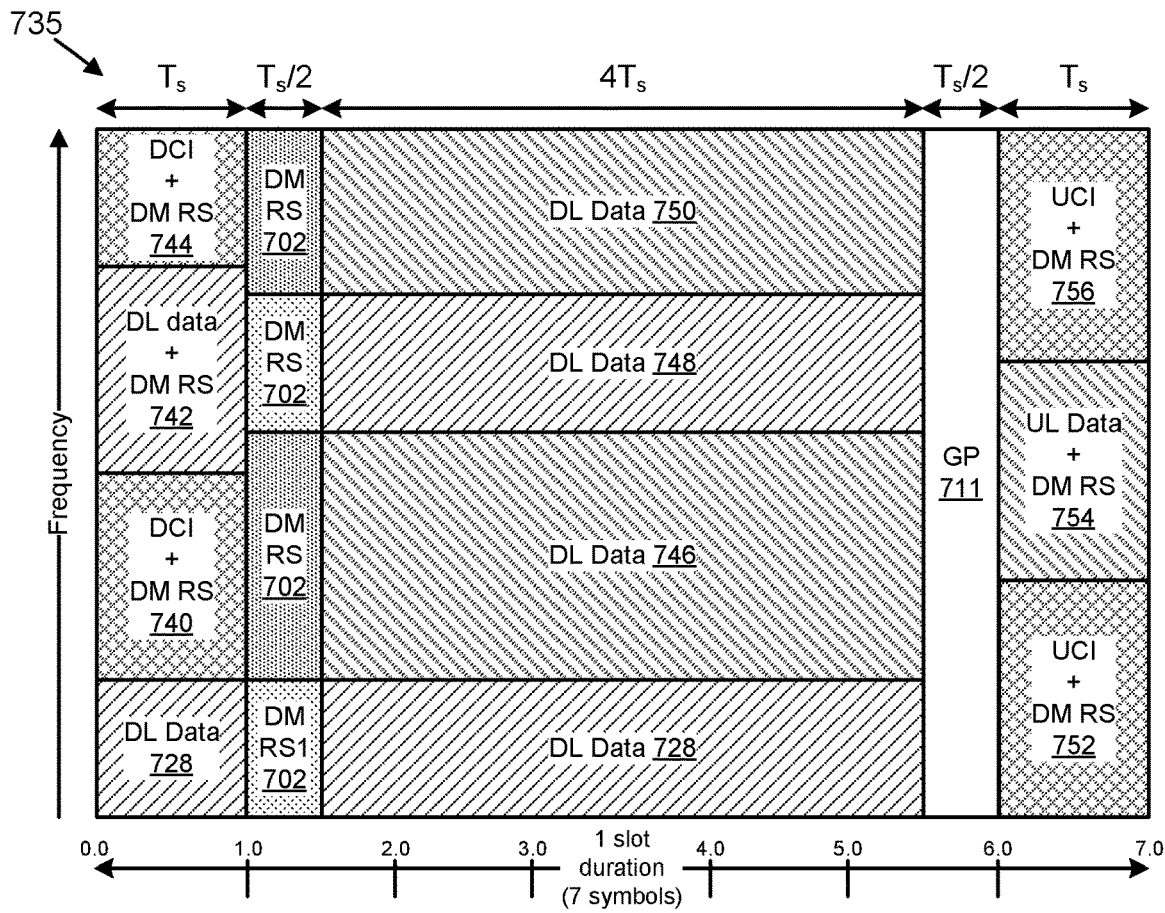
FIG. 7C is a block diagram illustrating embodiments of a mix of reference signals frequency-division multiplexed and time-division multiplexed with corresponding data channels or control channels.
Figure 7C:
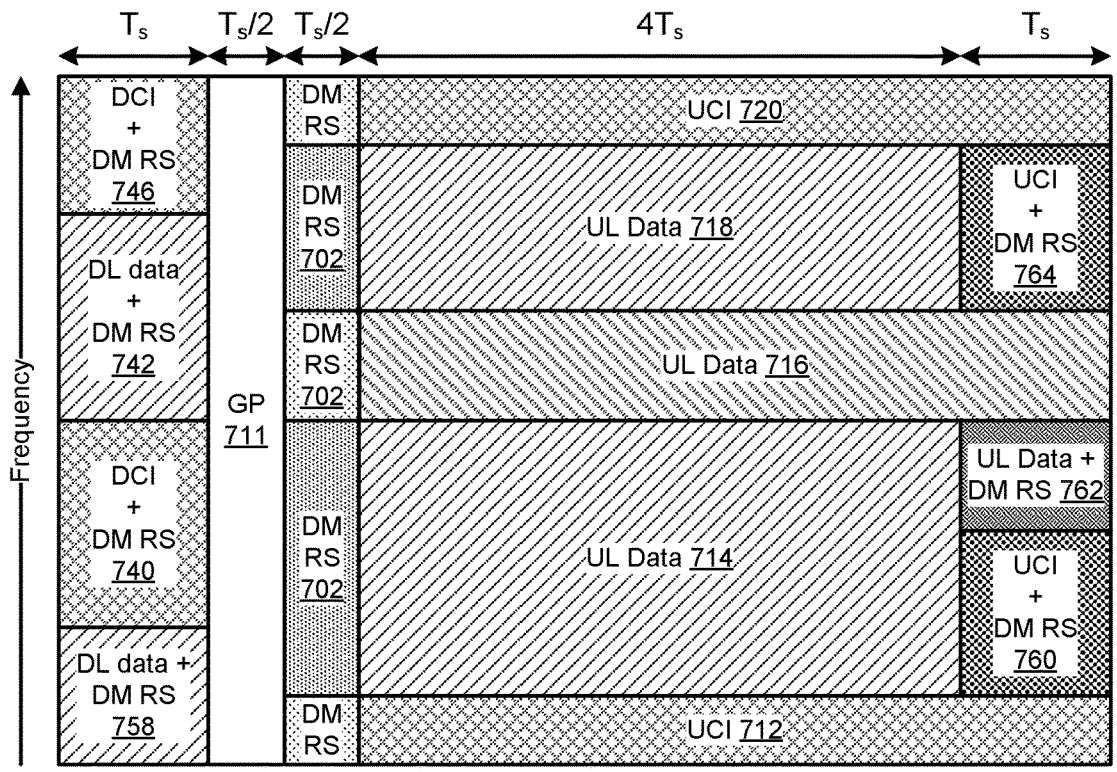
Figure 7D:
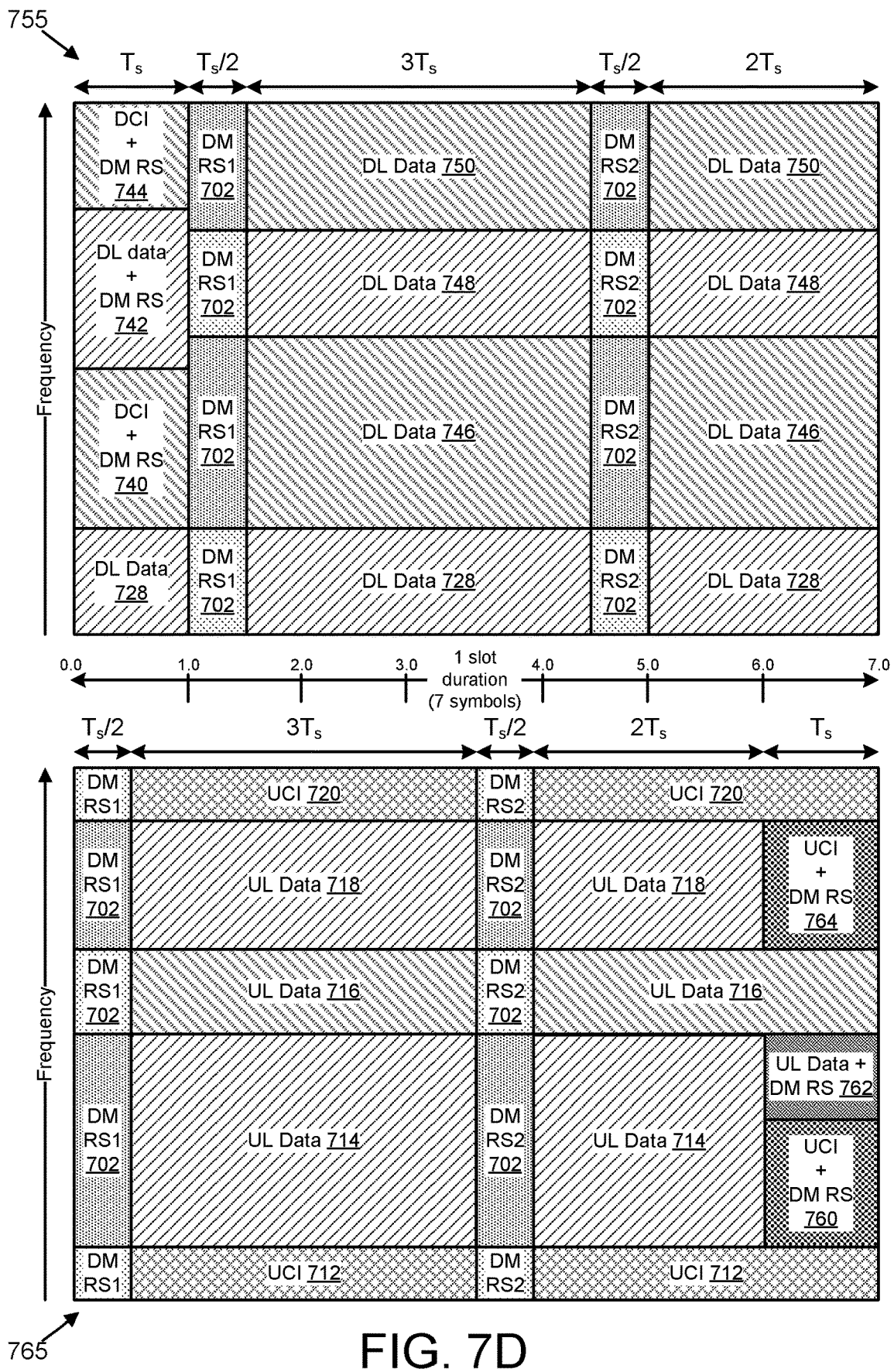
FIG. 7D is a diagram illustrating more embodiments of a mix of reference signals frequency-division multiplexed and time-division multiplexed with corresponding data channels or control channels.

FIGS. 7A and 7B show examples of slot usage with TDM DM RS for non-paired spectrum (e.g., TDD-mode operation). FIGS. 7C and 7D show examples of slot usage with a mix of TDM and FDM DM RS for non-paired spectrum (e.g., TDD-mode operation). In FIGS. 7A-7D, the slot duration is equal to 7 symbol durations ($T_S$).

FIGS. 7A-7D show exemplary uses of a slot from the system perspective in non-paired spectrum. Here, the slot comprises 7 OFDM (or DFT-S-OFDM) symbols with symbol duration of $T_s$. Throughout FIG. 7A-7D, 'UCI' occupying 1 symbol depicts short PUCCHs, and 'UCI' occupying more than 2 symbols corresponds to long PUCCHs. Short PUCCHs may be frequency division multiplexed with short UL data channels (e.g., PUSCH also occupying one or two symbol periods), long UL data channels (e.g., PUSCH occupying more than 2 symbol periods), and/or long PUCCH in the last symbol period.

In some embodiments, a mobile communication network may dynamically determine and signal, in slot n, radio resources (e.g., subcarrier allocation) of short PUCCH/PUSCH for slot n, considering other pre-scheduled long PUSCH/PUCCH transmission in slot n. (e.g., the UL data or a full/periodic CSI report). Dynamically adapting short PUCCH/PUSCH resources allows flexible scheduling of long PUSCH/PUCCH and enables efficient resource utilization. In case that there is no DL region in slot n, e.g., a UL-only slot for non-paired spectrum, subcarrier allocation of short PUCCH/PUSCH for slot n can be indicated in a slot n-k which includes a DL region, is prior to but closest to slot n.

In one embodiment, both short PUCCH and short PUSCH resources for slot n may be dynamically signaled via DCI 625 in slot n (or in slot n-k if there is no DL region in slot n). The resource of short PUCCH for HARQ-ACK feedback may be indicated in DCI scheduling a corresponding DL data channel, if the DL scheduling DCI is transmitted in slot n or slot n-k.

In a cell with unpaired spectrum, the network can set a guard period ("GP") 711 shorter than the symbol duration of a data channel and can exploit the remaining time of the symbol duration of the data channel, which is not reserved for the GP 711, for transmission/reception of DM RS 702 of the data channel. Here, the DM RS 702 of the data channel is transmitted/received with a larger subcarrier spacing (which corresponds to shorter symbol duration) than a subcarrier spacing of the data channel. The DM RS 702 is further time division multiplexed with the data channel, as shown. Note that the GP 711 accommodates DL-to-UL switching including hardware switching time and UL transmit timing advance (TA).

FIG. 7A illustrates a first slot usage example 700 and a second example 705 of slot usage with TDM DM RS 702. In the first slot usage example 700, the slot begins with a half-symbol used for transmission of DM RS 702. In the following symbol (e.g., from 0.5 to 1.5 symbols) short downlink data channels 704 and 708 are transmitted (e.g., PDSCH) and DCI 706 and 710 are transmitted (e.g., in downlink control channels, such as PDCCH), thus an example of time division multiplexing of DM RS with the downlink channels. Note that the DM RS 702 transmitted in the first half-symbol are associated with downlink channels transmitted in this symbol time. The GP 711 is set for the following half-symbol (e.g., from 1.5 to 2.0 symbols), wherein the system transitions from downlink to uplink.

Following the GP 711, the uplink portion of the slot begins with another half-symbol (e.g., from 2.0 to 2.5 symbols) being used for a DM RS 702. Here, the DM RS 702 are associated with uplink channels transmitted over at least the next three symbols (e.g., from 2.5 to 5.5 symbols), thus an example of time division multiplexing of DM RS with the uplink channels. The uplink channels include long uplink control channels carrying UCI 712 and UCI 720. Note that these control channels are considered to be "long" control channels as they are longer than two symbols in duration. The uplink channels also include long data channels (e.g., long PUSCHs) carrying UL data 714, 716, and 718.

In the following half-symbol (e.g., from 5.5 to 6.0 symbols) the UEs transmit another DM RS 702. Here, the DM RS 702 are associated with uplink channels transmitted over at least the last symbol (e.g., from 6.0 to 7.0 symbols), thus time division multiplexing of DM RS with the uplink channels. Note that the UCI 712 and UCI 720 continue in the last symbol. Also, the long data channel 716 continues into the last symbol of the slot. Accordingly, on these frequency bands (e.g., subcarriers), a first DM RS (labelled "DM RS1") is transmitted immediately following the GP 711 and a second DM RS (labelled "DM RS2") is transmitted immediately before the last symbol of the slot.

Additionally, the first slot usage example 700 includes short control channels (e.g., short PUCCH) for UCI 722, UL data 724 and UCI 726 transmitted in the last symbol of the slot. Recall that these channels are considered "short" uplink channels because they are not more than two symbols in duration. Also note that DM RS 702 corresponding to the short uplink channels are transmitted immediately before the short PUCCH/PUSCH.

In one embodiment, the UL data 724 and at least one of the UCI 722 and UCI 726 are transmitted by the same UE, and thus an example of short PUCCH multiplexed with short PUSCH in the frequency domain. In another embodiment, one of the UCI 712 and UCI 720 as well as at least one of the UCI 722 and UCI 726 are transmitted by the same UE, and thus an example of short PUCCH multiplexed with long PUCCH in the time and frequency domain. Such a UE handles the overlap of short PUCCH and long PUCCH in the last symbol of the slot as described above with reference to FIG. 6. In yet another embodiment, the UL data 716 and at least one of the UCI 722, the UL data 724, and UCI 726 are transmitted by the same UE, and thus an example of long PUSCH multiplexed with short PUCCH and/or short PUSCH in the time and frequency domain.

In the second slot usage example 705, the slot again begins with a half-symbol used for transmission of DM RS 702. In the following symbol (e.g., from 0.5 to 1.5 symbols) long downlink data channel 728 and short downlink data channel 708 are transmitted (e.g., PDSCH) and DCI 706 and 710 are transmitted, e.g., in short downlink control channels (such as PDCCH). Note that the DM RS 702 transmitted in the first half-symbol are associated with the downlink channels transmitted in this symbol time, thus time division multiplexing DM RS with the downlink channels. Another DM RS 702 is transmitted in the following half-symbol (e.g., from 1.5 to 2.0 symbols). Here, the DM RS 702 are associated with downlink data channels 728, 730, and 732 transmitted in the following three symbol periods (e.g., from 2.0 to 5.0 symbols), also time division multiplexing DM RS with the downlink channels. Note that here, that the downlink data channel 728 continues such that a second DM RS for the channel is transmitted from 1.5 to 2.0 symbols.

Following the long downlink data channels, the system sets a GP 711 for switching from downlink to uplink. Again, the GP has a half-symbol duration (e.g., from 5.0 to 5.5 symbols). Following the GP 711, the uplink portion of the slot begins with another half-symbol (e.g., from 5.5 to 6.0 symbols) being used for uplink DM RS 702. Here, the DM RS 702 are associated with uplink channels transmitted over the last symbol of the slot (e.g., from 6.0 to 7.0 symbols), thus time division multiplexing DM RS with the uplink channels. Here, the second slot usage example 705 includes short control channels (e.g., short PUCCH) for UCI 734 and UCI 738 and a short data channel (e.g., short PUSCH) for uplink data 736. Recall that these channels are considered "short" uplink channels because they are not more than two symbols in duration. Also note that DM RS 702 associated with the short uplink channels are transmitted immediately before the short PUCCH/PUSCH (and immediately following the GP 711). In one embodiment, the UL data 736 and at least one of the UCI 734 and UCI 738 are transmitted by the same UE, and thus an example of short PUCCH multiplexed with short PUSCH in the frequency domain.

FIG. 7B illustrates a third example 715 and a fourth example 725 of slot usage with TDM DM RS 702. In FIG. 7B, the depicted slots are dedicated to either uplink or downlink. In the third slot usage example 715, the first two symbols are used to transmit long PUCCH/PUSCH followed by transmission of DM RS 702 over half a symbol (e.g., from 2.0 to 2.5 symbols). After the first DM RS 702, transmission of the long PUCCH/PUSCH continues over the following three symbol durations (e.g., from 2.5 to 5.5 symbols), thus time division multiplexing DM RS with the uplink channels. Then another DM RS is transmitted over the next half-symbol (e.g., from 5.5 to 6.0 symbols). Note that these DM RS 702 are associated with at least the transmissions in the last symbol of the slot, thus time division multiplexing DM RS with uplink channels. In the last symbol, the third slot usage example 715 includes short control channels for the UCI 722 and UCI 726 and a short data channel for the uplink data 724. Further, the long control channels for the UCI 712 and UCI 720, as well as the long data channel for the uplink data 716, all continue into the last symbol of the slot.

Note that there is no switching from DL to UL in the third slot usage example 715, and so no GP 711 is required. Further, as discussed above, the same UE 205 may be assigned both one of UCI 712, UL data 716, and UCI 720 and one of the UCI 722, UL data 724, and the UCI 726, all of which overlap in time during the last symbol of the slot. Here, the UE may transmit the short channel (e.g., the UCI 722, UL data 724, or the UCI 726) without transmitting the long channel (e.g., the UCI 712, UL data 716, or UCI 720) based on UE capabilities and expected waveform of the uplink channels.

In one embodiment, the UL data 724 and at least one of the UCI 722 and UCI 726 are transmitted by the same UE, and thus an example of short PUCCH multiplexed with short PUSCH in the frequency domain. In another embodiment, one of the UCI 712 and UCI 720 as well as at least one of the UCI 722 and UCI 726 are transmitted by the same UE, and thus an example of short PUCCH multiplexed with long PUCCH in the time and frequency domain. Such a UE handles the overlap of short PUCCH and long PUCCH in the last symbol of the slot as described above with reference to FIG. 6. In yet another embodiment, the UL data 716 and at least one of the UCI 722, the UL data 724, and UCI 726 are transmitted by the same UE, and thus an example of long PUSCH multiplexed with short PUCCH and/or short PUSCH in the time and frequency domain.

In the fourth slot usage example 725, the slot begins with a half-symbol used for transmission of downlink DM RS 702. In the following symbol (e.g., from 0.5 to 1.5 symbols) long downlink data channel 728 and short downlink data channel 708 are transmitted (e.g., PDSCH) and DCI 706 and 710 are transmitted, e.g., in short downlink control channels (such as PDCCH), thus time division multiplexing DM RS with the downlink channels. Note that the DM RS 702 transmitted in the first half-symbol are associated with at least the downlink channels transmitted in this symbol time.

Another DM RS 702 is transmitted in the following half-symbol (e.g., from 1.5 to 2.0 symbols). Here, the DM RS 702 are associated with downlink data channels 728, 730, and 732 transmitted in the following five symbol periods (e.g., from 2.0 to 7.0 symbols), thus time division multiplexing DM RS with the downlink channels. Note that here, that the downlink data channel 728 continues such that a second DM RS for the channel is transmitted from 1.5 to 2.0 symbols.

FIG. 7C illustrates a fifth example 735 and sixth example 745 of slot usage. Here, however, the slot usage includes both TDM DM RS and FDM DM RS. In the fifth slot usage example 735, the slot begins with a whole symbol used for transmission of short downlink channels 740-744 multiplexed with FDM DM RS. Included are the DCI+DM RS combination 740, the DL data+DM RS combination 742, and the DCI+DM RS combination 744. Note that DL data 728 (without multiplexed FDM DM RS) is also transmitted in the first symbol.

At the beginning of the second symbol, TDM DM RS 702 is transmitted for half a symbol duration (e.g., from 1.0 to 1.5 symbols). Note that the DM RS 702 transmitted here are associated with the long downlink channels transmitted in the following four symbols (e.g., from 1.5 to 5.5 symbols), thus time division multiplexing DM RS with the downlink channels. Here, the DM RS 702 are associated with downlink data channels carrying the DL data 728, 746, 748, and

750 and transmitted in the following three symbol periods (e.g., from 2.0 to 5.0 symbols). Note also, that the downlink data channel 728 continues.

Following the long downlink data channels, the system sets a GP 711 for switching from downlink to uplink. As before, the GP has a half-symbol duration (e.g., from 5.5 to 6.0 symbols). Following the GP 711, the uplink portion of the slot begins with the last symbol (e.g., from 6.0 to 7.0 symbols) being used for short uplink channels multiplexed with FDM DM RS. Depicted here are the UCI+DM RS combination 752, the UL data+DM RS combination 754, and the UCI+DM RS combination 756. In one embodiment, the UL data+DM RS combination 754 and at least one of the UCI+DM RS combination 752 and UCI+DM RS combination 756 are transmitted by the same UE, and thus an example of short PUCCH multiplexed with short PUSCH in the frequency domain (and further multiplexed with DM RS in the frequency domain).

In the sixth slot usage example 745, the slot begins with a whole symbol used for transmission of short downlink channels 740-744 multiplexed with FDM DM RS. Included are the DCI+DM RS combination 740, the DL data+DM RS combination 742, the DCI+DM RS combination 744, and the DL data+DM RS combination 758. Note that DL data 728 (without multiplexed FDM DM RS) is also transmitted in the first symbol.

Following the short downlink data channels, the system sets a GP 711 for switching from downlink to uplink. As before, the GP has a half-symbol duration (e.g., from 1.0 to 1.5 symbols). Following the GP 711, the uplink portion of the slot begins with TDM DM RS 702 being transmitted over half a symbol duration (e.g., from 1.5 to 2.0 symbols). Note that the DM RS 702 transmitted here are associated with the long uplink channels transmitted in the following four symbols (e.g., from 2.0 to 6.0 symbols), thus time division multiplexing DM RS with the uplink channels. Here, the DM RS 702 are associated with uplink control channels for UCI 712 and 720 and uplink data channels for UL data 714, UL data 716, and UL data 718. Note also, that the uplink control channels for UCI 712 and UCI 720 continue to the end of the slot (e.g., continue into the last symbol). Additionally, the sixth slot usage example 745 depicts in the last symbol (e.g., from 6.0 to 7.0 symbols) being used for short uplink channels multiplexed with FDM DM RS. Depicted here are the UCI+DM RS combination 760, the UL data+DM RS combination 762, and the UCI+DM RS combination 764.

In one embodiment, the UL data+DM RS combination 762 and at least one of the UCI+DM RS combination 760 and UCI+DM RS combination 764 are transmitted by the same UE, and thus an example of short PUCCH multiplexed with short PUSCH in the frequency domain (and further multiplexed with DM RS in the frequency domain). In another embodiment, one of the UCI 712 and UCI 720 as well as at least one of the UCI+DM RS combination 760 and UCI+DM RS combination 764 are transmitted by the same UE, and thus an example of short PUCCH multiplexed with long PUCCH in the time domain. Such a UE handles the overlap of short PUCCH and long PUCCH in the last symbol of the slot as described above with reference to FIG. 6. In yet another embodiment, the UL data 716 and at least one of the at least one of the UCI+DM RS combination 760, UL data+DM RS combination 762, and UCI+DM RS combination 764 are transmitted by the same UE, and thus an example of long PUSCH multiplexed with short PUCCH and/or short PUSCH in the time and frequency domain.

FIG. 7D illustrates a seventh example 755 and an eighth example 765 of slot usage. Again, the slot usage in FIG. 7D includes both FDM DM RS and TDM DM RS 702. In FIG. 7D, the depicted slots are dedicated to either uplink or downlink. In the seventh slot usage example 755, the slot begins with a whole symbol used for transmission of short downlink channels 740-744 multiplexed with FDM DM RS. Included are the DCI+DM RS combination 740, the DL data+DM RS combination 742, and the DCI+DM RS combination 744. Note that DL data 728 (without multiplexed FDM DM RS) is also transmitted in the first symbol.

At the beginning of the second symbol, TDM DM RS 702 is transmitted for half a symbol duration (e.g., from 1.0 to 1.5 symbols). Note that the DM RS 702 transmitted here are associated with the long downlink channels transmitted in the following four symbols (e.g., from 1.5 to 5.5 symbols), thus time division multiplexing DM RS with downlink channels. Here, the DM RS 702 are associated with downlink data channels for the DL data 728, the DL data 746, the DL data 748, and the DL data 750 transmitted in the following three symbol periods (e.g., from 1.5 to 4.5 symbols). Note also, that the downlink data channel 728 continues.

A TDM DM RS 702 is again transmitted, e.g., from 4.5 to 5.0 symbols. Here, the DM RS 702 are second DM RS 702 for the downlink data channels carrying the DL data 728, the DL data 746, the DL data 748, and the DL data 750, again time division multiplexing DM RS with the data channels. The DL data channels then communicate the DL data 728, 746, 748, and 750 over the final two symbols of the slot.

In the eighth slot usage example 765, the slot begins with a half-symbol used for transmission of downlink DM RS 702. In the following three symbols (e.g., from 0.5 to 3.5 symbols) UCI 712 and 720 are transmitted on long uplink control channels and UL data 714, UL data 716, and UL data 718 are transmitted on long uplink data channels, thus time division multiplexing DM RS with the uplink channels. A second TDM DM RS 702 is again transmitted, e.g., from 3.5 to 4.0 symbols. Here, the DM RS 702 are second DM RS 702 for the long uplink control channels and long uplink data channels, again time division multiplexing DM RS with uplink channels. Additionally, the eighth slot usage example 765 depicts in the last symbol (e.g., from 6.0 to 7.0 symbols) being used for short uplink channels multiplexed with FDM DM RS. Depicted here are the UCI+DM RS combination 760, the UL data+DM RS combination 762, and the UCI+DM RS combination 764.

In one embodiment, the UL data+DM RS combination 762 and at least one of the UCI+DM RS combination 760 and UCI+DM RS combination 764 are transmitted by the same UE, and thus an example of short PUCCH multiplexed with short PUSCH in the frequency domain (and further multiplexed with DM RS in the frequency domain). In another embodiment, one of the UCI 712 and UCI 720 as well as at least one of the UCI+DM RS combination 760 and UCI+DM RS combination 764 are transmitted by the same UE, and thus an example of short PUCCH multiplexed with long PUCCH in the time and frequency domain. Such a UE handles the overlap of short PUCCH and long PUCCH in the last symbol of the slot as described above with reference to FIG. 6. In yet another embodiment, the UL data 716 and at least one of the UCI+DM RS combination 760, UL data+DM RS combination 762, and UCI+DM RS combination 764 are transmitted by the same UE, and thus an example of long PUSCH multiplexed with short PUCCH and/or short PUSCH in the time and frequency domain.

However, because a system-wide guard period of a half symbol duration may not be large enough for some UEs in a large cell, in other embodiments the following UE/network operation may be needed:

If estimated/measured round trip propagation delay or the Timing Advance value signaling by the base station for a UE 205 is larger than T1 but smaller than T2 (e.g., T1<T2), then the UE 205 skips receiving the last DL symbol and switches to a scheduled UL transmission. For DL demodulation, the UE 205 may set log-likely hood ratio ("LLR") information of channels bits of the skipped DL symbol to zero (e.g., puncturing). In one example, T1 is equal to the system-wide guard period of a half symbol duration, and T2 is equal to the sum of the system-wide guard period and one symbol duration.

If estimated/measured round trip propagation delay or the Timing Advance value signaling by the base station for a UE is larger than T1 but smaller than T2 (T1<T2) and if the UE is scheduled with long PUSCH/PUCCH right after system-wide GP in a slot, then the UE 205 skips transmitting the first UL symbol.

If estimated/measured round trip propagation delay or the Timing Advance value signaling by the base station for the UE 205 is larger than T2, the network does not schedule the UE 205 with short PUSCH/PUCCH together with DL reception in the same a slot.

If estimated/measured round trip propagation delay or the Timing Advance value signaling by the base station for the UE 205 is larger than T2 and if the UE is scheduled with long PUSCH/PUCCH right after a system-wide GP in a slot, the network assumes that UE 205 will not monitor DCI and will not receive any downlink data in that slot.

Figure 8:
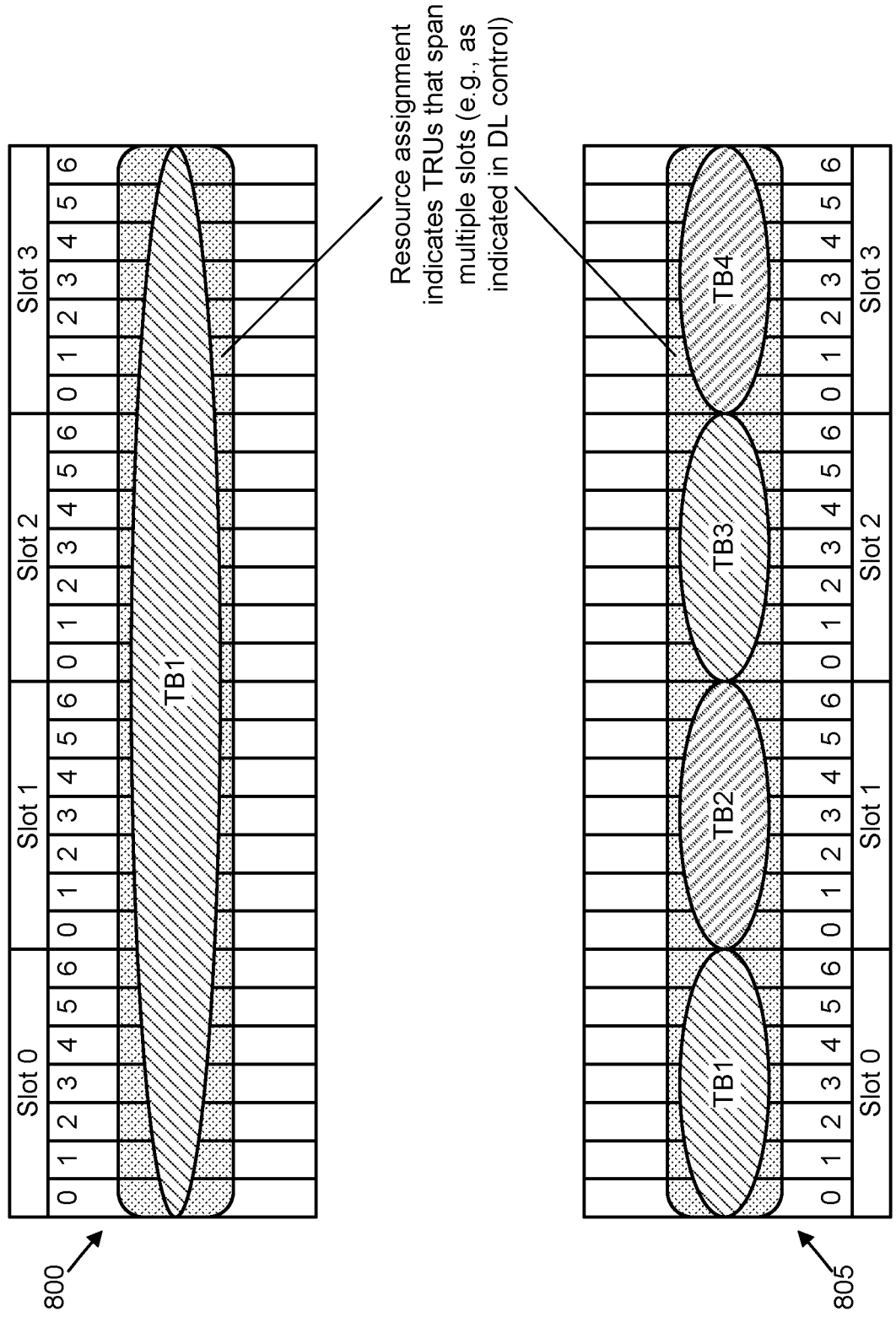
FIG. 8 is a diagram illustrating multi-slot scheduling between a gNB and a UE.

FIG. 8 depicts multi-slot scheduling between a gNB and a UE, such as the UE 205 and gNB 210. When the UE 205 receives a DL data resource assignment (e.g. a PDSCH resource assignment), the resource assignment may be applicable to a single slot or multiple slots. As depicted, the UE 205 may receive downlink control signal (e.g., DCI) with a resource assignment applicable to slot 0, slot 1, slot 2, and slot 3. When the resource assignment is applicable to multiple slots, data sent over the multiple slots may be sent as one TB or media access control layer protocol data unit ("MAC PDU") or can be sent as multiple TBs or MAC PDUs.

As depicted, a first resource assignment 800 includes a single TB that spans slot 0, slot 1, slot 2, and slot 3. In contrast, a second resource assignment 805 includes a multiple TBs in the assignment that spans slot 0, slot 1, slot 2, and slot 3. While FIG. 8 shows four TBs with one TB per slot, in other embodiments a resource assignment may have more or fewer TBs over the same number of TRUs and the TB boundaries may or may not align with the slot boundaries.

Whether the downlink data is sent as one or multiple TBs can be indicated to the UE 205 as part of the PDSCH resource assignment (i.e., dynamically). In another embodiment, it can be indicated via higher layer signaling (e.g. via RRC). Moreover, HARQ-ACK transmissions by the UE 205 (either on a dedicated UL control channel, e.g. PUCCH; or piggybacked with UL data transmission, e.g. within PUSCH) in response to data reception corresponding to the DL data resource assignment may depend on whether the resource assignment is for multiple TBs or a whether it assigns a single TB.

Figure 9A:
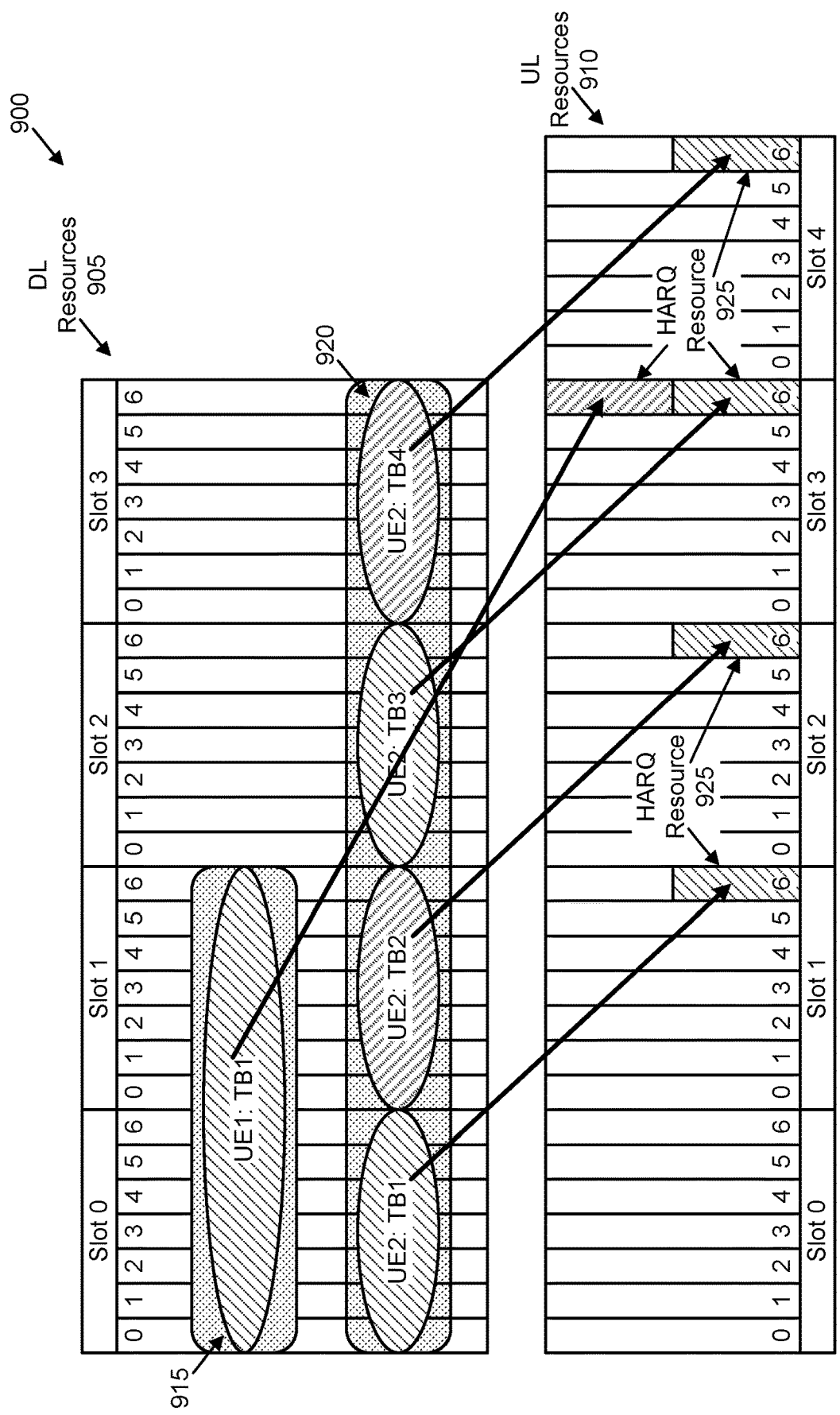
FIG. 9A is a diagram illustrating uplink control message timing for multi-slot scheduling between a gNB and a UE, with the UE transmitting a short-duration uplink channel.
Figure 9B:
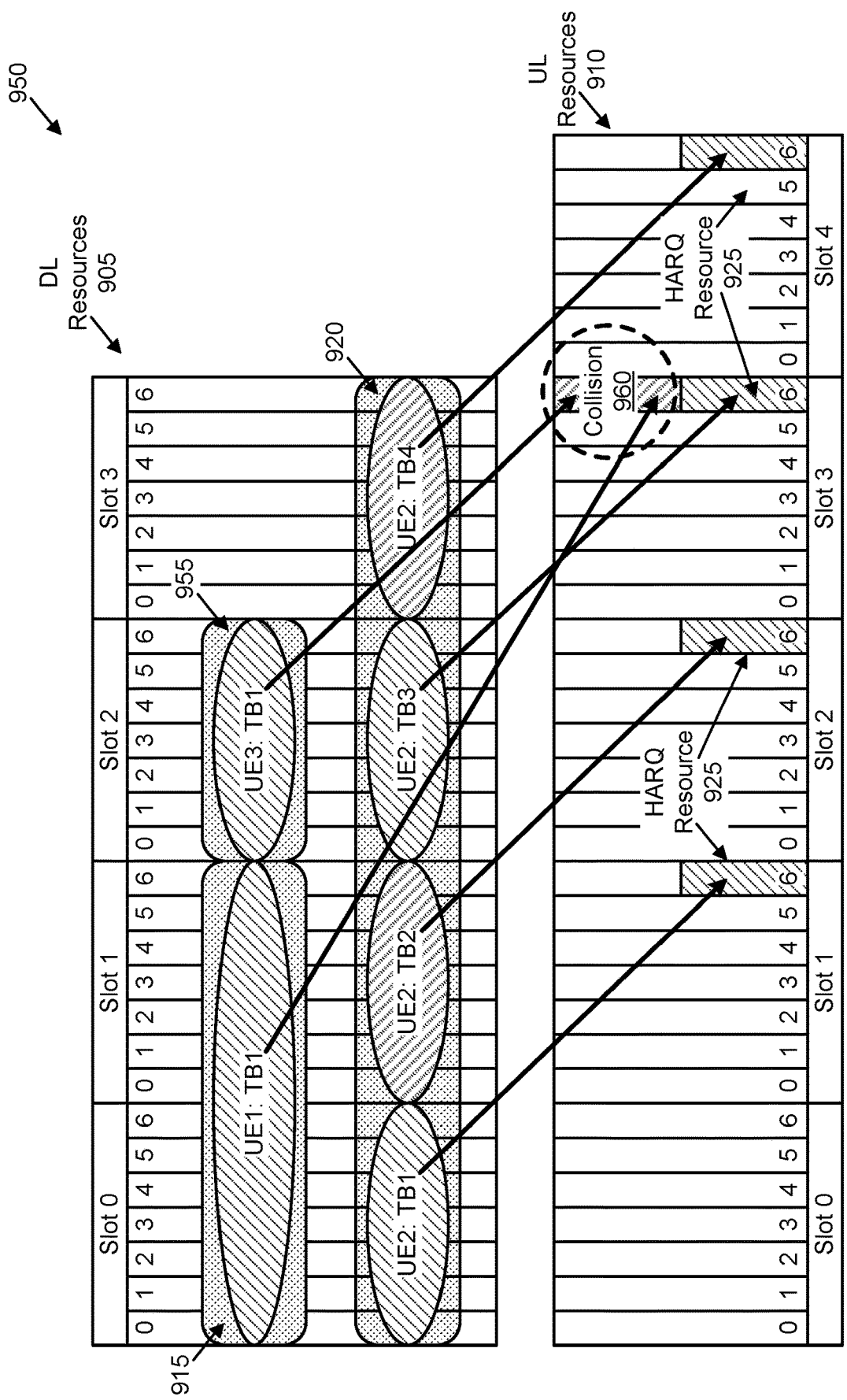
FIG. 9B is a diagram illustrating uplink control message collision for multi-slot scheduling between a gNB and a UE, with the UE transmitting a short-duration uplink channel.

FIGS. 9A and 9B depict uplink control message timing for multi-slot scheduling between a gNB and a UE, with the UE transmitting a short-duration uplink channel. FIG. 9A shows downlink resources 905 and uplink resources 910 for a first timing scenario 900. As depicted, a first UE ("UE1") receives a first DL resource assignment 915 that spans slot 0 and slot 1. Here, the DL resources assignment comprises multiple FRUs (frequency resource units, e.g. RBs) and multiple TRUs (Time Resource Units, e.g. slots or OFDM symbols). Note that the first DL resource assignment 915 is for a single TB, despite the assignment spanning multiple slots.

Upon receiving the DL data in the assigned first DL resource 915, the UE1 is expected to provide HARQ-ACK feedback. Assume here that the UE1 is to use short PUCCH to transmit the HARQ-ACK feedback (or multiplex the HARQ-ACK feedback with UL data in short PUSCH). In some embodiments, the UE1 uses information implicit in the first DL resource assignment 915 to select an uplink resource for transmitting a short uplink control channel carrying the HARQ-ACK feedback.

In some embodiments, the UL resource used for HARQ-ACK transmission is selected based on the last assigned TRU of the TB. As discussed above, the short PUCCH/PUSCH is located in the last symbol(s) of the slot. Moreover, the subcarriers for the short uplink control channel carrying the HARQ-ACK feedback may be selected based on the FRUs in which the UE1 receives the DL data (e.g., based on the starting RB index of the assigned RBs). Using the information implicit in the first DL resource assignment 915, the UE1 selects a HARQ resource 925 (e.g., from a set of possible HARQ resources) for transmitting a short uplink control channel carrying the HARQ-ACK feedback. As depicted, the UE1 transmits HARQ-ACK feedback in slot 3.

Also, a second UE ("UE2") receives a second DL resource assignment 920 that spans slot 0, slot 1, slot 2, and slot 3. Again, the DL resources assignment comprises multiple FRUs (frequency resource units, e.g. RBs) and multiple TRUs (Time Resource Units, e.g. slots or OFDM symbols). Here, the second DL resource assignment 920 is for multiple TBs; specifically, one TB for each slot.

Upon receiving the DL data in the assigned second DL resource 920, the UE2 is expected to provide HARQ-ACK feedback for each TB. Assume here that the UE2 is to use short PUCCH to transmit the HARQ-ACK feedback (or multiplex the HARQ-ACK feedback with UL data in short PUSCH). Because the resource assignment corresponds to multiple TBs, it is beneficial for the UE2 to send multiple HARQ-ACK transmissions, e.g., each corresponding to a TB. Beneficially, this reduces the latency in scheduling retransmissions for those TBs, thereby improving system performance.

In some embodiments, the UE2 uses information implicit in the second DL resource assignment 920 to select an uplink resource for each short uplink control channel carrying the HARQ-ACK feedback. In some embodiments, the UL resource used for HARQ-ACK transmission is selected based on the last assigned TRU of each TB. As discussed above, the short PUCCH/PUSCH is located in the last symbol(s) of the slot. Moreover, the subcarriers for the short uplink control channel carrying the HARQ-ACK feedback may be selected based on the FRUs in which the UE2 receives the DL data (e.g., based on the starting RB index of the assigned RBs).

Using the information implicit in the second DL resource assignment 920, the UE2 selects a HARQ resource 925 (e.g., from a set of possible HARQ resources) for each TB, to be used in transmitting a short uplink control channel carrying the HARQ-ACK feedback corresponding to the TB. Here, the UE2 transmits HARQ-ACK feedback for TB1 in slot 1, transmits HARQ-ACK feedback for TB2 in slot 2, transmits HARQ-ACK feedback for TB3 in slot 3, and transmits HARQ-ACK feedback for TB4 in slot 4. Note that the UE1 and the UE2 both transmit HARQ-ACK in slot 3. However, there is no collision of PUCCH because the UE1 and UE2 select different uplink frequency resources due to being assigned different FRUs (e.g., different RBs) for the TBs.

Note that the time delay between ending slot for DL and corresponding UL HARQ-ACK transmission can vary based on the TB size and/or the transmission duration of the TB and/or timing advance restriction (e.g., such as maximum timing advance value). As depicted, the TB1 for the UE1 is a large TB (e.g., spanning more than one slot) and so the corresponding HARQ-ACK is with longer delay than the TBs for the UE2. Here, the UE1 sends HARQ-ACK feedback corresponding to its TB1 after 2 slots, while for UE2 the corresponding HARQ-ACK is sent in the immediate slot following the slot in which each individual TB ends (e.g., due to each individual TB not spanning more than one slot).

FIG. 9B depicts a second timing scenario 950 where the UE selecting a HARQ resource 925 based on implicit determination using the DL resource assignment leads to a collision 960. In the second timing scenario 950, the system schedules a first DL resource 915 for the UE1 in slots 0 and 1 and schedules a second DL resource 920 for the UE2 in slots 0-3. Note that the first DL resource assignment 915 and second DL resource assignment 920 occupy different RBs of the DL resources 905. Additionally, the system schedules a third DL resource assignment 955 to a third UE ("UE3") in slot 2 and on the same RBs as the first DL resource assignment 915. This leads to the situation where HARQ-ACK resource selection based only on <ending TRU on which TB is received, FRUs on which TB is received> with a HARQ-ACK feedback delay configured or predefined for a respective TB duration leads to the UE1 and the UE2 picking the same HARQ resource 925. This leads to collisions and degraded performance.

Here, the UE1 determines to send its HARQ-ACK feedback in slot 3 due to being given a large TB (or a longer duration for the TB) ending in slot 1. Also, the UE3, which has a small TB ending in slot 2, determines to send its HARQ-ACK feedback in slot 3 (note that smaller TBs require less processing time and thus may have shorter HARQ-ACK latency). As discussed above, the system has multiple HARQ resources 925 for each slot; however, because the UE1 and the UE3 are assigned same FRUs (since their DL transmissions are not time overlapping), then they end up picking the same HARQ resource 925 when HARQ-ACK resource selection based only on <ending TRU on which TB is received, FRUs on which TB is received>. This is illustrated by collision 960.

However, as the network is aware of the TRUs, FRUs, and TBs corresponding to the various DL resource assignments, the system can preempt the collision 960 by indicating (e.g., to the UE1 and/or the UE3) a HARQ resource 925 to use for short PUCCH. In certain embodiments, the UE3 (and/or UE1) is configured with multiple HARQ resources 925 via higher layers (e.g., via the RRC layer). In such embodiments, the third DL resource assignment 955 (and/or the first DL resource assignment 915) includes an indication of a HARQ resource 925 to use. For example, the indication may be a 2-bit element where a value of '00' indicates that the UE is to use the implicitly determined HARQ resource 925, a value of '01' indicates that the UE is to use a first resource configured by higher layers, a value of '10' indicates that the UE is to use a second resource configured by higher layers, and a value of '11' indicates that the UE is to use a third resource configured by higher layers. Accordingly, the UE3 transmits its HARQ-ACK in slot 3 based on the indication. If the UE3 doesn't receive the indication, or if it is not configured with higher layer configured resources, the UE can send its HARQ-ACK based on the implicitly determined resource. In an alternative embodiment, the indication may indicate an offset (e.g., RB index offset or HARQ resource index offset) to use when selecting the HARQ resource 925.

Figure 10:
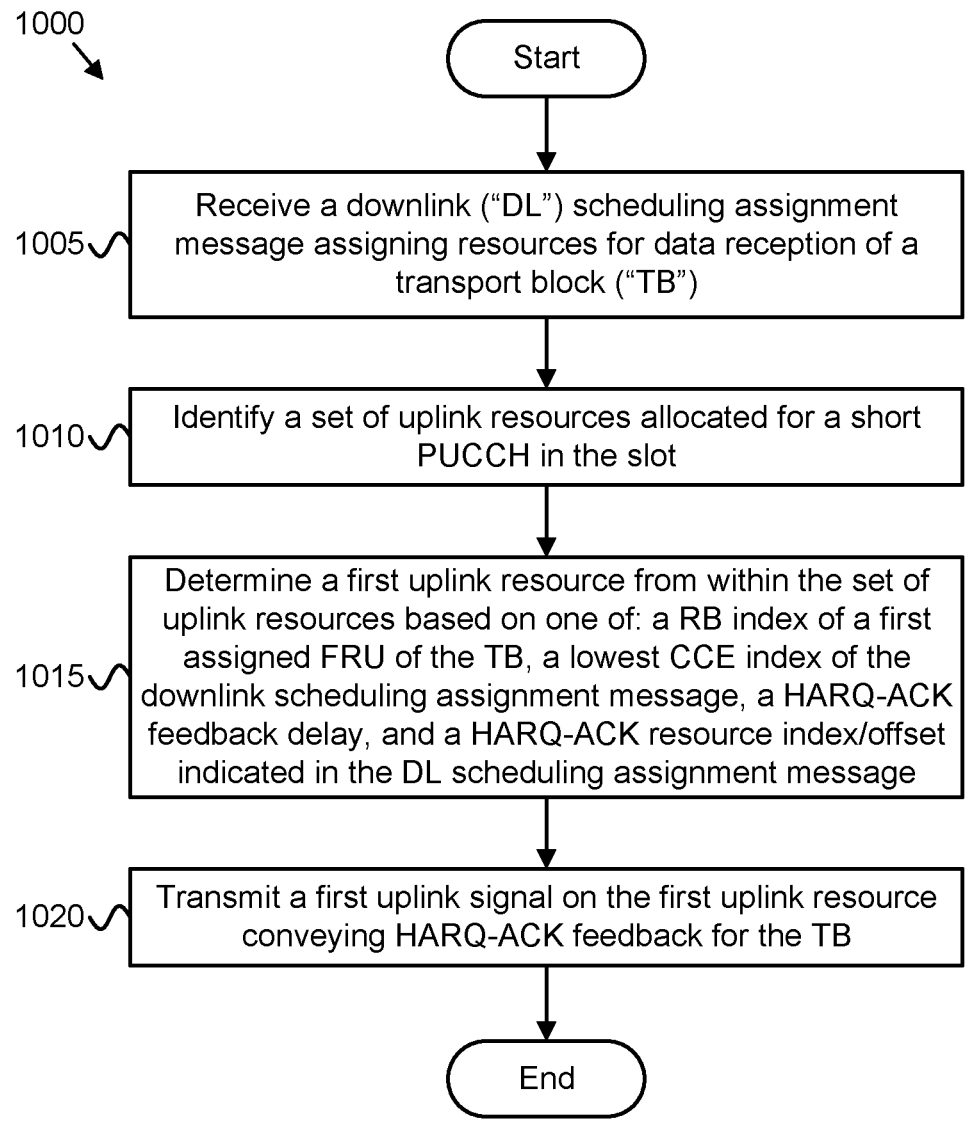
FIG. 10 is a flow chart diagram illustrating one embodiment of a method for transmitting a short-duration uplink channel.

FIG. 10 depicts a method 1000 for transmitting a short-duration uplink channel, according to embodiments of the disclosure. In some embodiments, the method 1000 is performed by an apparatus, such as the remote unit 105, the UE 205, and/or the user equipment apparatus 400. In certain embodiments, the method 1000 may be performed by a processor executing program code, for example, a microcontroller, a microprocessor, a CPU, a GPU, an auxiliary processing unit, a FPGA, or the like.

The method 1000 begins and receives 1005 a downlink scheduling assignment message assigning resources for data reception of a TB. In some embodiments, the TB is received in the same slot as the first uplink resource.

The method 1000 includes identifying 1010 a set of uplink resources allocated for a first uplink channel in a slot. In some embodiments, identifying 1010 includes receiving a DCI indicating the set of resources allocated for the first uplink channel. In one embodiment, receiving the DCI includes receiving common DCI in a common control region of the slot. In certain embodiments, identifying 1010 a set of uplink resources includes receiving a higher layer message configuring a set of HARQ-ACK resources.

The method 1000 includes determining 1015 a first uplink resource from within the set of uplink resources. Here, the determination is based on one of: a RB index of a first assigned FRU of the TB, a lowest CCE index of the downlink scheduling assignment message, a HARQ-ACK feedback delay, and a HARQ-ACK resource index/offset indicated in the downlink scheduling assignment message.

In some embodiments, determining 1015 a first uplink resource includes determining a time-domain resource of the first uplink resource based on at least an ending TRU of the TB. In certain embodiments, determining 1015 a first uplink resource includes identifying a HARQ-ACK resource index indicated in the downlink scheduling assignment message, wherein the HARQ-ACK resource index indicates a specific resource from a configured set of HARQ-ACK resources.

In certain embodiments, the resources for data reception comprise multiple TRUs and multiple FRUs corresponding to multiple TBs. Here, determining 1015 a first uplink resource includes determining an uplink resource for each TB in response to receiving the TB. In one embodiment, the TRU is a slot comprising an integer number of OFDM symbols and the FRU is a resource block comprising 12 subcarriers.

The method 1000 includes transmitting 1020 the first uplink channel on the first uplink resource conveying at least HARQ-ACK feedback for the TB, wherein the first uplink channel comprises one or two symbols, and the method 1000 ends. Where the resources for data reception correspond to multiple TBs, then transmitting 1020 the first uplink channel includes transmitting HARQ-ACK feedback for at least one TB prior to receiving all TBs in the downlink resource assignment.

In certain embodiments, the remote unit receives scheduling information to transmit a second uplink channel on a second uplink resource in the slot, wherein the first uplink resource and the second uplink resource at least partially overlap in the time domain. Here, the second uplink resource is larger than the first uplink resource in the time domain. In such embodiments, transmitting 1020 the first uplink channel on the first uplink resource includes transmitting the first uplink channel during the overlap time.

In one embodiment, the second uplink channel is also transmitted during the overlap time. For example, the first uplink channel and second uplink channel may be intended for the same TRP. In another embodiment, the first uplink channel and second uplink channel may be intended for different TRPs and the remote unit supports more than one transmit beamforming weight at a given time instance. Where the remote unit is incapable of transmitting to two TRPs simultaneously (e.g., incapable of more than one transmit beamforming weight at a given time instance) or where the first uplink channel and second uplink channel are to be transmitted with different waveforms (e.g., OFDM and DFT-S-OFDM), then the transmitting 1020 the first uplink channel on the first uplink resource includes transmitting only the first uplink channel during the overlap time. In another embodiment, transmitting 1020 the first uplink channel on the first uplink resource includes multiplexing the first uplink channel into the second uplink channel.

In certain embodiments, transmitting 1020 the first uplink channel comprises transmitting immediately after transmitting a reference signal. For example, the UE may receive the TB in a first OFDM symbol, and transition from DL-to-UL during a gap period. Moreover, the reference signal may be transmitted immediately after the gap period in a second OFDM symbol and using a different subcarrier spacing value than used to transmit the first uplink channel. Accordingly, the first uplink channel is transmitted in a third OFDM symbol immediately following the reference signal, but using the same subcarrier spacing value as used to communicate the TB. Here, the reference signal subcarrier spacing value may be an integer multiple of the subcarrier spacing value used to communicate the TB and first uplink channel.

Figure 11:
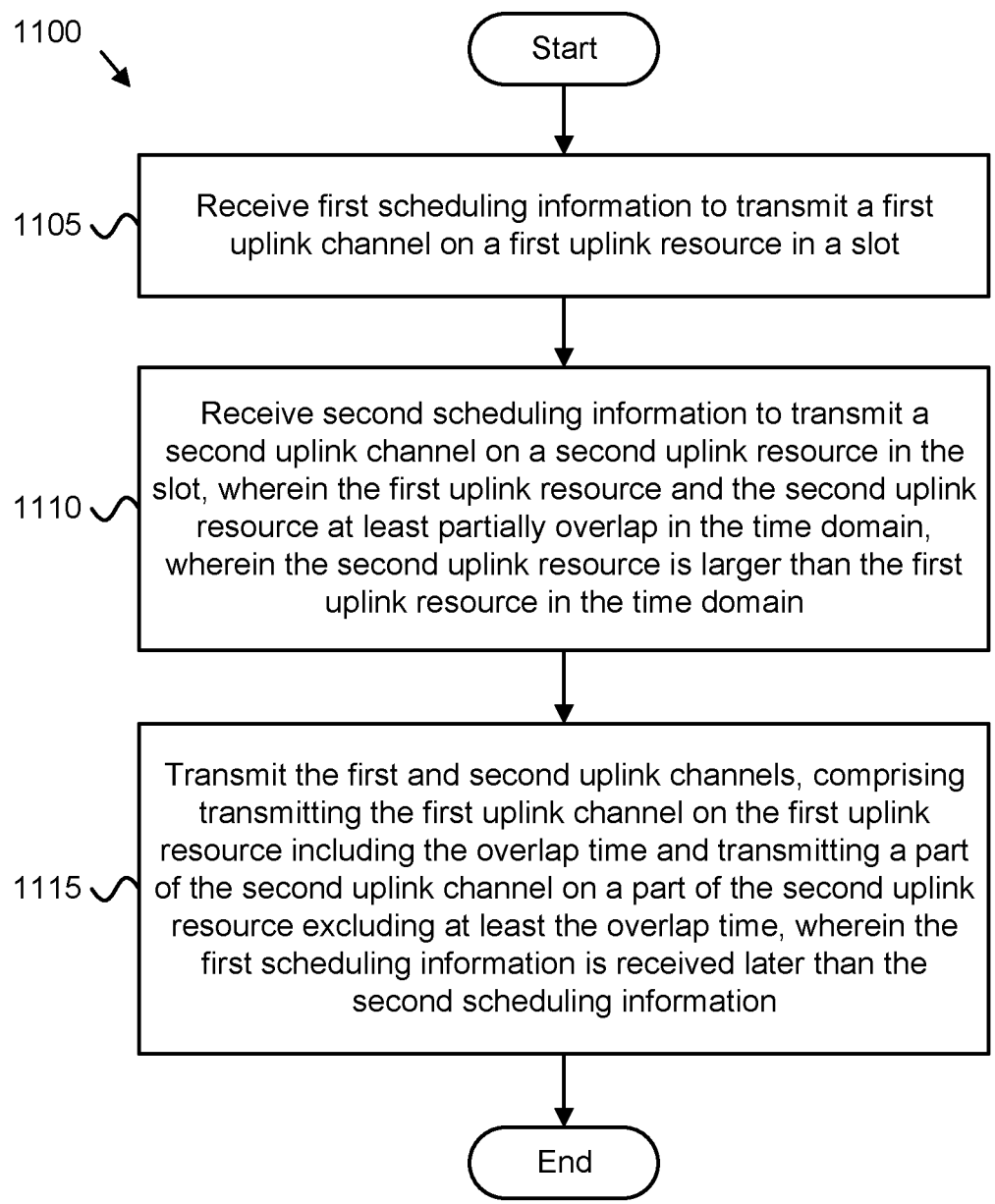
FIG. 11 is a flow chart diagram illustrating one embodiment of a method for transmitting an uplink channel.

FIG. 11 depicts one embodiment of a method 1100 for transmitting an uplink channel, according to embodiments of the disclosure. In various embodiments, the method 1100 is performed by the remote unit 105, the UE 205, and/or the user equipment apparatus 400, described above. In some embodiments, the method 1100 is performed by a processor, such as a microcontroller, a microprocessor, a CPU, a GPU, an auxiliary processing unit, a FPGA, or the like.

The method 1100 begins and receives 1105 first scheduling information to transmit a first uplink channel on a first uplink resource in a slot. The method 1100 includes receiving 1110 second scheduling information to transmit a second uplink channel on a second uplink resource in the slot. Here, the first uplink resource and the second uplink resource at least partially overlap in the time domain. Additionally, the first scheduling information is received later than the second scheduling information and the second uplink resource is larger than the first uplink resource in the time domain. The method 1100 includes transmitting 1115 the first and second uplink channels, including transmitting the first uplink channel on the first uplink resource including the overlap time and transmitting a part of the second uplink channel on a part of the second uplink resource excluding at least the overlap time. The method 1100 ends.

Figure 12:
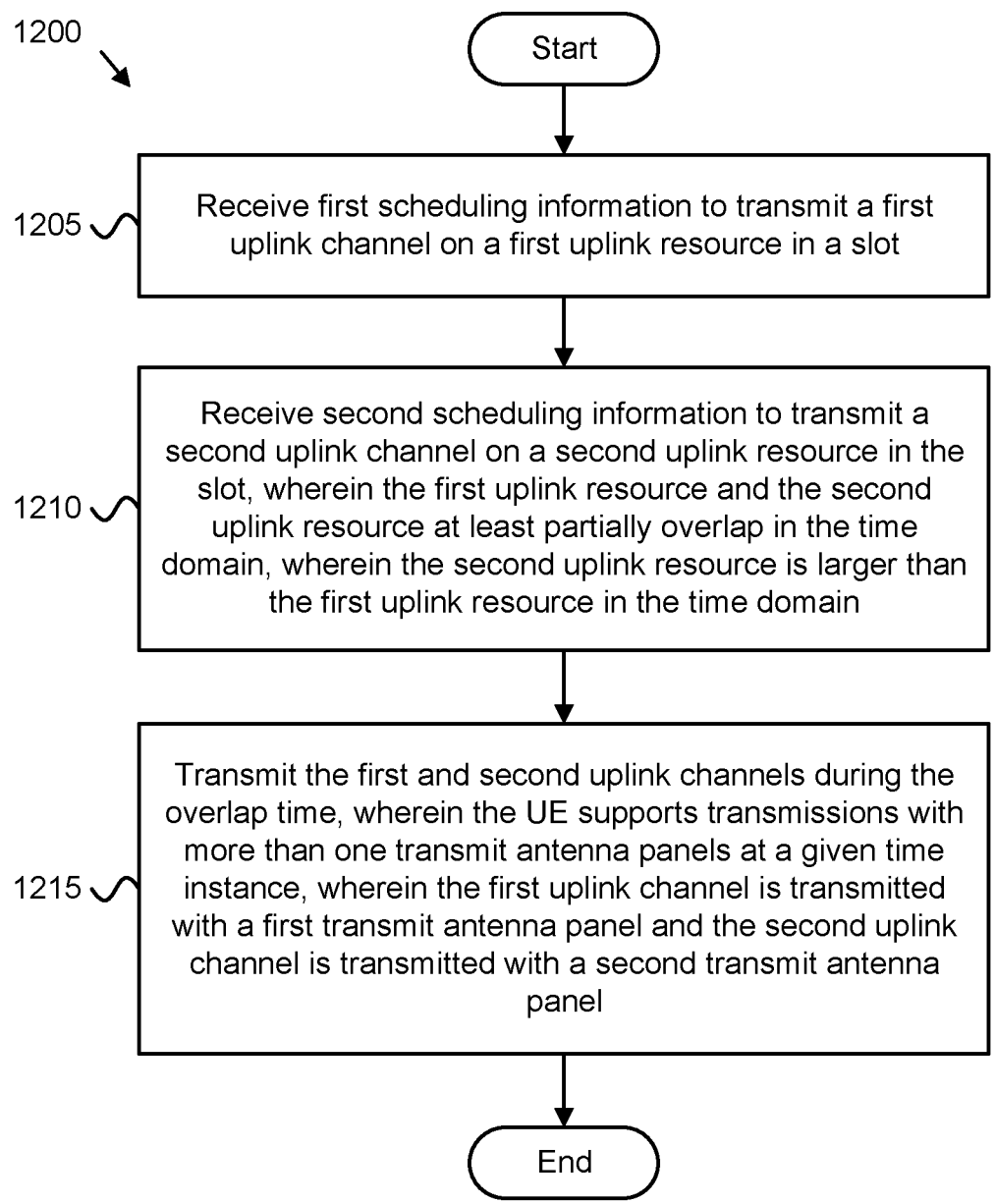
FIG. 12 is a flow chart diagram illustrating one embodiment of another method for transmitting an uplink channel.

FIG. 12 depicts one embodiment of a method 1200 for transmitting an uplink channel, according to embodiments of the disclosure. In various embodiments, the method 1200 is performed by a UE, such as the remote unit 105, the UE 205, and/or the user equipment apparatus 400, described above. In some embodiments, the method 1200 is performed by a processor, such as a microcontroller, a microprocessor, a CPU, a GPU, an auxiliary processing unit, a FPGA, or the like.

The method 1200 begins and receives 1205 first scheduling information to transmit a first uplink channel on a first uplink resource in a slot. The method 1200 includes receiving 1210 second scheduling information to transmit a second uplink channel on a second uplink resource in the slot. Here, the first uplink resource and the second uplink resource at least partially overlap in the time domain, wherein the second uplink resource is larger than the first uplink resource in the time domain. The method 1200 includes transmitting 1215 the first and second uplink channels during the overlap time. Here, the UE supports transmissions with more than one transmit antenna panel at a given time instance, wherein the first uplink channel is transmitted with a first transmit antenna panel and the second uplink channel is transmitted with a second transmit antenna panel. The method 1200 ends.

Figure 13:
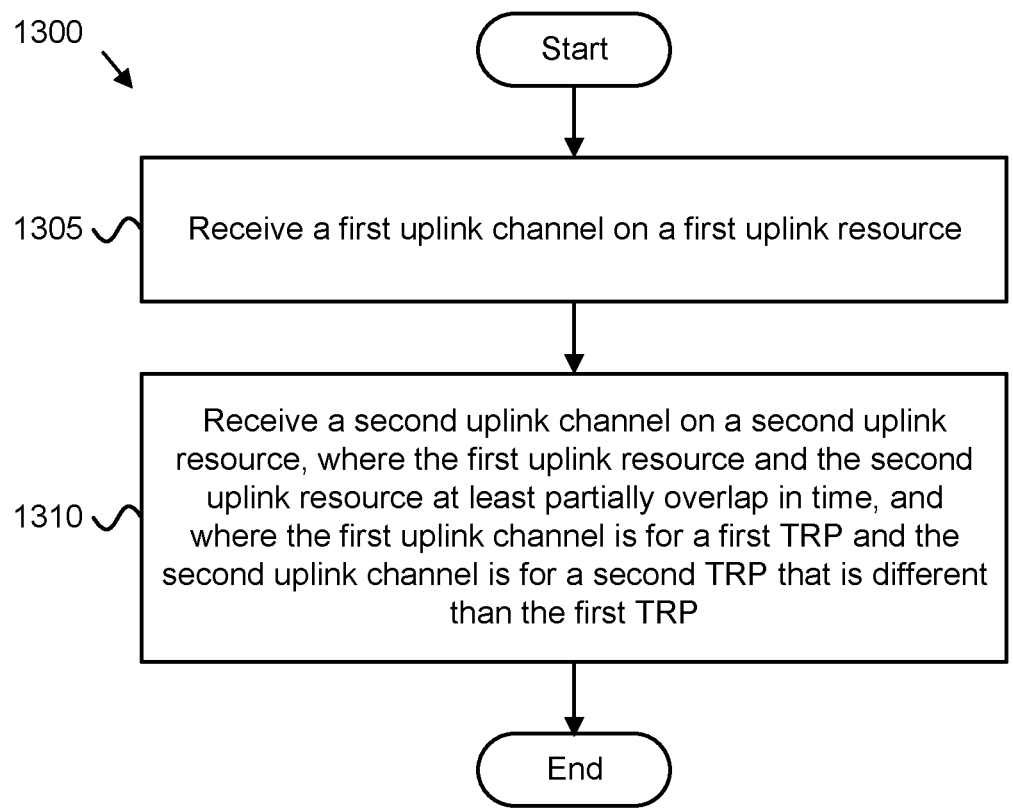
FIG. 13 is a flow chart diagram illustrating one embodiment of a method for receiving an uplink channel.

FIG. 13 depicts one embodiment of a method 1300 for simultaneous UE transmission to multiple TRPs, according to embodiments of the disclosure. In various embodiments, the method 1300 is performed by the base unit 121, the gNB 210, and/or the base station apparatus 500, described above. In some embodiments, the method 1300 is performed by a processor, such as a microcontroller, a microprocessor, a CPU, a GPU, an auxiliary processing unit, a FPGA, or the like.

The method 1300 begins and receives 1305 a first uplink channel on a first uplink resource. The method 1300 includes receiving 1310 a second uplink channel on a second uplink resource, where the first uplink resource and the second uplink resource at least partially overlap in time, and where the first uplink channel is for a first TRP and the second uplink channel is for a second TRP that is different than the first TRP. The method 1300 ends.

Figure 14:
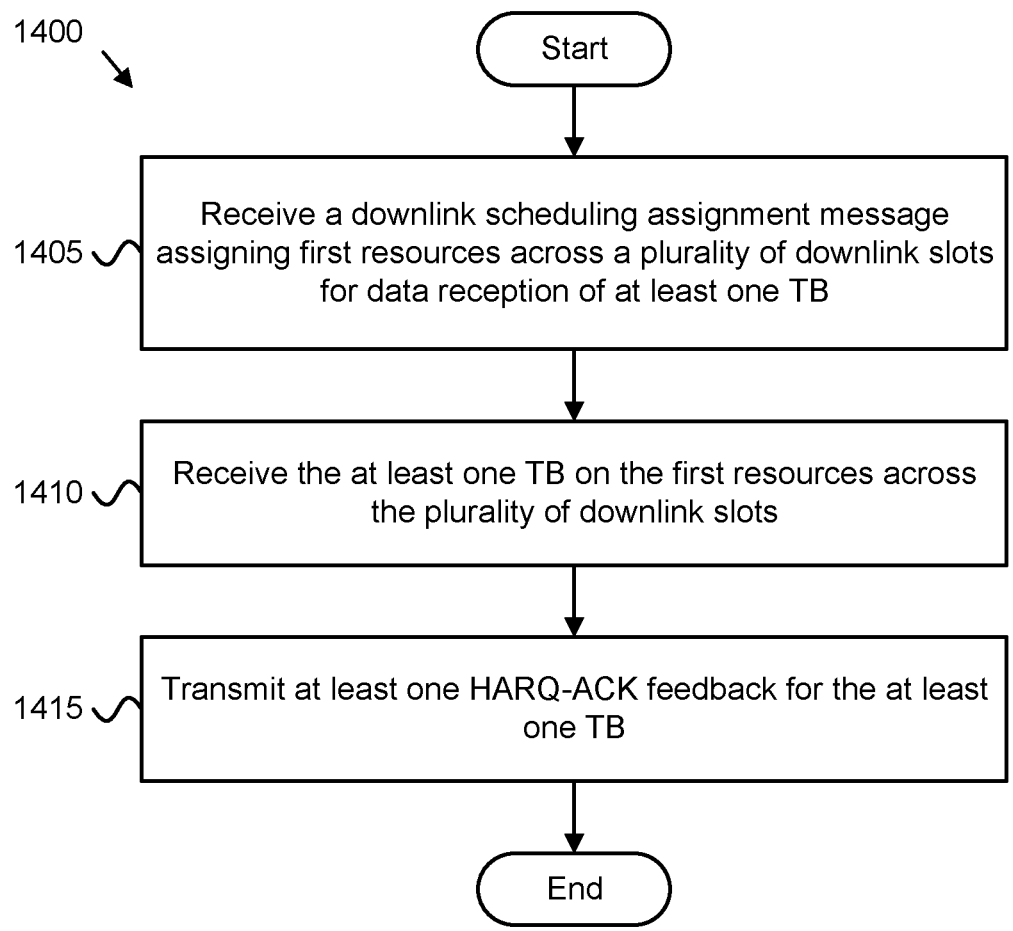
FIG. 14 is a flow chart diagram illustrating one embodiment of a method for receiving a downlink scheduling assignment.

FIG. 14 depicts one embodiment of a method 1400 for transmitting an uplink channel, according to embodiments of the disclosure. In various embodiments, the method 1400 is performed by a UE, such as the remote unit 105, the UE 205, and/or the user equipment apparatus 400, described above. In some embodiments, the method 1400 is performed by a processor, such as a microcontroller, a microprocessor, a CPU, a GPU, an auxiliary processing unit, a FPGA, or the like.

The method 1400 begins and receives 1405 a downlink scheduling assignment message that assigns first resources across a plurality of downlink slots for data reception of at least one Transport Block ("TB"). The method 1400 includes receiving 1410 the at least one TB on the first resources across the plurality of downlink slots. The method 1400 includes transmitting 1415 at least one HARQ-ACK feedback for the at least one TB. The method 1400 ends.

Disclosed herein is a first apparatus for simultaneous reception to multiple TRPs, according to embodiments of the disclosure. The first apparatus may be implemented by a network entity, such as the base unit 121, the gNB 210, and/or the base station apparatus 500. The first apparatus includes a transceiver that communicates with a remote unit (i.e., UE) in a mobile communication network and a processor that receives, from the remote unit, a first uplink channel on a first uplink resource and receives, from the remote unit, a second uplink channel on a second uplink resource, where the first uplink resource and the second uplink resource at least partially overlap in time. Here, the first uplink channel is for a first transmission and reception point ("TRP") and the second uplink channel is for a second TRP, wherein the first TRP is different than the second TRP.

In some embodiments, the remote unit (i.e., UE) supports transmissions with more than one transmit antenna panels at a given time instance, wherein the first uplink channel is transmitted, by the remote unit, with a first transmit antenna panel and the second uplink channel is transmitted, by the UE, with a second transmit antenna panel.

In some embodiments, the processor further transmits (i.e., via the transceiver) first scheduling information of the first uplink channel and transmitting second scheduling information of the second uplink channel.

In certain embodiments, the first uplink channel is a physical uplink control channel ("PUCCH"). In such embodiments, transmitting the first scheduling information includes transmitting a higher layer message configuring a set of PUCCH resources and transmitting downlink control information ("DCI") including a downlink scheduling assignment message, wherein the UE selects the first uplink resource from the set of PUCCH resources based on the DCI.

In some embodiments, the first and second scheduling information contain information of waveforms for the first and second uplink channels, respectively. In such embodiments, receiving the first and second uplink channels includes receiving the first and second uplink channels of the respective waveforms.

Disclosed herein is a first method for simultaneous reception to multiple TRPs, according to embodiments of the disclosure. The first method may be performed by a network entity, such as base unit 121, the gNB 210, and/or the base station apparatus 500. The first method includes receiving, from a user equipment ("UE"), a first uplink channel on a first uplink resource and receiving, from the UE (i.e., a remote unit), a second uplink channel on a second uplink resource, where the first uplink resource and the second uplink resource at least partially overlap in time. Here, the first uplink channel is for a first transmission and reception point ("TRP") and the second uplink channel is for a second TRP, wherein the first TRP is different than the second TRP.

In some embodiments, the UE supports transmissions with more than one transmit antenna panels at a given time instance. In such embodiments, the first uplink channel is transmitted, by the UE, with a first transmit antenna panel and the second uplink channel is transmitted, by the UE, with a second transmit antenna panel.

In some embodiments, the first method includes transmitting first scheduling information of the first uplink channel and transmitting second scheduling information of the second uplink channel.

In certain embodiments, the first uplink channel is a physical uplink control channel ("PUCCH"). In such embodiments, transmitting the first scheduling information includes transmitting a higher layer message configuring a set of PUCCH resources and transmitting downlink control information ("DCI") including a downlink scheduling assignment message, wherein the UE selects the first uplink resource from the set of PUCCH resources based on the DCI.

In certain embodiments, the first and second scheduling information contain information of waveforms for the first and second uplink channels, respectively. In such embodiments, receiving the first and second uplink channels includes receiving the first and second uplink channels of the respective waveforms.

Disclosed herein is a second apparatus for transmitting an uplink channel, according to embodiments of the disclosure. The second apparatus may be implemented by a user equipment ("UE"), such as the remote unit 105, the UE 205, and/or the user equipment apparatus 400. The second apparatus includes a transceiver that communicates with a base unit in a mobile communication network. The second apparatus includes a processor that receives, at the UE, a downlink scheduling assignment message assigning resources across a plurality of downlink slots for data reception of at least one transport block ("TB"). The processor receives the at least one TB on the resources across the plurality of downlink slots. The processor transmits at least one hybrid automatic repeat request-acknowledgement ("HARQ-ACK") feedback for the at least one TB.

In some embodiments, the resources across the plurality of downlink slots are assigned for a TB. In such embodiments, the processor determines an uplink slot based on a last downlink slot of the plurality of downlink slots, where the HARQ-ACK feedback for the TB is transmitted in the uplink slot.

In some embodiments, the resources across the plurality of downlink slots are assigned for a plurality of TBs. In such embodiments, the processor determines a plurality of uplink slots, each uplink slot based on a last downlink slot of each TB of the plurality of TBs, where each HARQ-ACK feedback for each TB is transmitted in each uplink slot of the plurality of uplink slots.

In some embodiments, the processor further receives a higher layer message configuring a set of physical uplink control channel ("PUCCH") resources and determines a PUCCH resource from the set of PUCCH resources based on downlink control information ("DCI") including the downlink scheduling assignment message, where the at least one HARQ-ACK feedback is transmitted based on the PUCCH resource. In certain embodiments, the PUCCH resource is determined based on the DCI and the lowest control channel element ("CCE") index of the DCI.

Disclosed herein is a second method for transmitting an uplink channel, according to embodiments of the disclosure. The second method may be performed by a user equipment ("UE"), such as the remote unit 105, the UE 205, and/or the user equipment apparatus 400. The second method includes receiving, at the UE, a downlink scheduling assignment message assigning resources across a plurality of downlink slots for data reception of at least one transport block ("TB"). The second method includes receiving the at least one TB on the resources across the plurality of downlink slots and transmitting at least one hybrid automatic repeat request-acknowledgement ("HARQ-ACK") feedback for the at least one TB.

In some embodiments, the resources across the plurality of downlink slots are assigned for a TB. In such embodiments, the second method includes determining an uplink slot based on a last downlink slot of the plurality of downlink slots, where the HARQ-ACK feedback for the TB is transmitted in the uplink slot.

In some embodiments, the resources across the plurality of downlink slots are assigned for a plurality of TBs. In such embodiments, the second method includes determining a plurality of uplink slots, each uplink slot based on a last downlink slot of each TB of the plurality of TBs, where each HARQ-ACK feedback for each TB is transmitted in each uplink slot of the plurality of uplink slots.

In some embodiments, the second method includes receiving a higher layer message configuring a set of physical uplink control channel ("PUCCH") resources and determining a PUCCH resource from the set of PUCCH resources based on downlink control information ("DCI")

including the downlink scheduling assignment message, where the at least one HARQ-ACK feedback is transmitted based on the PUCCH resource. In certain embodiments, the PUCCH resource is determined based on the DCI and the lowest control channel element ("CCE") index of the DCI.

Disclosed herein is a third apparatus for transmitting an uplink channel, according to embodiments of the disclosure. The third apparatus may be implemented by a UE, such as the remote unit 105, the UE 205, and/or the user equipment apparatus 400. The third apparatus includes a transceiver that communicates with a base unit in a mobile communication network. The third apparatus includes a processor that receives first scheduling information to transmit a first uplink channel on a first uplink resource in a slot and receives second scheduling information to transmit a second uplink channel on a second uplink resource in the slot. Here, the first uplink resource and the second uplink resource at least partially overlap in the time domain. Additionally, the first scheduling information is received later than the second scheduling information and the second uplink resource is larger than the first uplink resource in the time domain. The processor transmits (e.g., via the transceiver) the first uplink channel and second uplink channel, including transmitting the first uplink channel on the first uplink resource including the overlap time and transmitting a part of the second uplink channel on a part of the second uplink resource excluding at least the overlap time.

In some embodiments, the first uplink channel carries at least one of low-latency data and low-latency control information. In some embodiments, the first uplink channel contains one or two symbols in the slot. In some embodiments, the transceiver further receives a higher layer message configuring waveforms for the first and second uplink channels, respectively and transmitting the first and second uplink channels with the respective configured waveforms. In one embodiment, the UE may be configured by higher layer signaling to use an OFDM waveform. In another embodiment, the UE may be configured by higher layer signaling to use a DFT-S-OFDM waveform.

In some embodiments, receiving the first scheduling information to transmit the first uplink channel in the slot includes receiving a downlink scheduling assignment message assigning resources for data reception of a TB and identifying the first uplink resource for the first uplink channel in the slot, the first uplink channel conveying HARQ-ACK feedback for the TB. In certain embodiments, the first uplink channel is a PUCCH. In such embodiments, identifying the first uplink resource for the first uplink channel in the slot further includes: receiving a higher layer message configuring a set of PUCCH resources, determining the slot based on an ending slot of the TB, and determining the first uplink resource from the set of PUCCH resources based on DCI, including the downlink scheduling assignment message and the lowest CCE index of the DCI.

In some embodiments, the UE supports a transmission with a single transmit antenna panel at a given time instance. In certain embodiments, transmitting the first and second uplink channels includes transmitting the first uplink channel and the second uplink channel with different transmit antenna panels.

Disclosed herein is a third method for transmitting an uplink channel, according to embodiments of the disclosure. The third method may be performed by a UE, such as the remote unit 105, the UE 205, and/or the user equipment apparatus 400. The third method includes receiving first scheduling information to transmit a first uplink channel on a first uplink resource in a slot and receiving second scheduling information to transmit a second uplink channel on a second uplink resource in the slot. Here, the first uplink resource and the second uplink resource at least partially overlap in the time domain. Additionally, the first scheduling information is received later than the second scheduling information and the second uplink resource is larger than the first uplink resource in the time domain. The third method includes transmitting the first and second uplink channels, including transmitting the first uplink channel on the first uplink resource including the overlap time and transmitting a part of the second uplink channel on a part of the second uplink resource excluding at least the overlap time.

In some embodiments, the first uplink channel carries at least one of low-latency data and low-latency control information. In some embodiments, the first uplink channel contains one or two symbols in the slot. In some embodiments, the third method further includes receiving a higher layer message configuring waveforms for the first and second uplink channels, respectively and transmitting the first and second uplink channels with the respective configured waveforms. In one embodiment, the UE may be configured by higher layer signaling to use an OFDM waveform. In another embodiment, the UE may be configured by higher layer signaling to use a DFT-S-OFDM waveform.

In some embodiments, receiving the first scheduling information to transmit the first uplink channel in the slot includes receiving a downlink scheduling assignment message assigning resources for data reception of a TB and identifying the first uplink resource for the first uplink channel in the slot, the first uplink channel conveying HARQ-ACK feedback for the TB. In certain embodiments, the first uplink channel is a PUCCH. In such embodiments, identifying the first uplink resource for the first uplink channel in the slot includes: receiving a higher layer message configuring a set of PUCCH resources, determining the slot based on an ending slot of the TB, and determining the first uplink resource from the set of PUCCH resources based on DCI, including the downlink scheduling assignment message and the lowest CCE index of the DCI.

In some embodiments, the UE supports a transmission with a single transmit antenna panel at a given time instance. In certain embodiments, transmitting the first and second uplink channels includes transmitting the first uplink channel and the second uplink channel with different transmit antenna panels.

Disclosed herein is a fourth apparatus for transmitting an uplink channel, according to embodiments of the disclosure. The fourth apparatus may be implemented by a UE, such as the remote unit 105, the UE 205, and/or the user equipment apparatus 400. The fourth apparatus includes a transceiver that communicates with a base unit in a mobile communication network and a processor that receives first scheduling information to transmit a first uplink channel on a first uplink resource in a slot and receives second scheduling information to transmit a second uplink channel on a second uplink resource in the slot. Here, the first uplink resource and the second uplink resource at least partially overlap in the time domain, wherein the second uplink resource is larger than the first uplink resource in the time domain. The processor transmits (e.g., via the transceiver) the first and second uplink channels during the overlap time. Here, the UE supports transmissions with more than one transmit antenna panel at a given time instance, wherein the first uplink channel is transmitted with a first transmit antenna panel and the second uplink channel is transmitted with a second transmit antenna panel.

In some embodiments, the first uplink channel is a physical uplink shared channel. In some embodiments, the first uplink channel is for a first TRP and the second uplink channel is for a second TRP, wherein the first TRP is different than the second TRP.

In some embodiments, receiving the first scheduling information to transmit the first uplink channel in the slot includes: receiving a downlink scheduling assignment message assigning resources for data reception of a TB and identifying the first uplink resource for the first uplink channel in the slot, the first uplink channel conveying HARQ-ACK feedback for the TB.

In certain embodiments, the first uplink channel may be a PUCCH. In such embodiments, identifying the first uplink resource for the first uplink channel in the slot includes: receiving a higher layer message configuring a set of PUCCH resources, determining the slot based on an ending slot of the TB, and determining the first uplink resource from the set of PUCCH resources based on DCI, including the downlink scheduling assignment message and the lowest CCE index of the DCI.

Disclosed herein is a fourth method for transmitting an uplink channel, according to embodiments of the disclosure. The fourth method may be performed by a UE, such as the remote unit 105, the UE 205, and/or the user equipment apparatus 400. The fourth method includes receiving first scheduling information to transmit a first uplink channel on a first uplink resource in a slot and receiving second scheduling information to transmit a second uplink channel on a second uplink resource in the slot. Here, the first uplink resource and the second uplink resource at least partially overlap in the time domain, wherein the second uplink resource is larger than the first uplink resource in the time domain. The fourth method includes transmitting the first and second uplink channels during the overlap time. Here, the UE supports transmissions with more than one transmit antenna panel at a given time instance, wherein the first uplink channel is transmitted with a first transmit antenna panel and the second uplink channel is transmitted with a second transmit antenna panel.

In some embodiments, the first uplink channel is a physical uplink shared channel. In some embodiments, the first uplink channel is for a first TRP and the second uplink channel is for a second TRP, wherein the first TRP is different than the second TRP.

In some embodiments, receiving the first scheduling information to transmit the first uplink channel in the slot includes: receiving a downlink scheduling assignment message assigning resources for data reception of a TB and identifying the first uplink resource for the first uplink channel in the slot, the first uplink channel conveying HARQ-ACK feedback for the TB.

In certain embodiments, the first uplink channel may be a PUCCH. In such embodiments, identifying the first uplink resource for the first uplink channel in the slot includes: receiving a higher layer message configuring a set of PUCCH resources, determining the slot based on an ending slot of the TB, and determining the first uplink resource from the set of PUCCH resources based on DCI, including the downlink scheduling assignment message and the lowest CCE index of the DCI.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed by a user equipment ("UE"), the method comprising:
    receiving a downlink resource assignment associated with a plurality of downlink slots for data reception of at least one transport block ("TB"), wherein each slot of the plurality of slots comprises a plurality of orthogonal frequency division multiplexing ("OFDM") symbols;
    receive the at least one TB in one or more slots of the plurality of downlink slots;
    determining a resource for transmission of hybrid automatic repeat request-acknowledgement ("HARQ-ACK") feedback based on the plurality of downlink slots associated with the at least one TB and an indication included in the downlink resource assignment, wherein the indication comprises one or more bits and indicates a basis for determining the resource; and
    transmitting the at least one HARQ-ACK feedback for the at least one TB.

2. The method of claim 1,
    wherein the downlink resource assignment is assigned for a TB, and
    wherein the method further comprises determining an uplink slot based on a last downlink slot of the plurality of downlink slots, wherein the HARQ-ACK feedback for the TB is transmitted in the uplink slot.

3. The method of claim 1,
    wherein the downlink resource assignment is assigned for a plurality of TBs, and
    wherein the method further comprises determining a plurality of uplink slots, each uplink slot based on a last downlink slot of each TB of the plurality of TBs, wherein each HARQ-ACK feedback for each TB is transmitted in each uplink slot of the plurality of uplink slots.

4. The method of claim 1, further comprising:
    receiving a higher layer message configuring a set of physical uplink control channel ("PUCCH") resources; and
    determining a PUCCH resource from the set of PUCCH resources based on downlink control information ("DCI") and the downlink resource assignment, wherein the at least one HARQ-ACK feedback is transmitted based on the PUCCH resource.

5. The method of claim 4, wherein the PUCCH resource is determined based on the DCI and a lowest control channel element ("CCE") index of the DCI.

6. A user equipment ("UE") for wireless communication, comprising:
    at least one memory; and
    at least one processor coupled with the at least one memory and configured to cause the UE to:
    receive a downlink resource assignment associated with a plurality of downlink slots for data reception of at least one transport block ("TB"), wherein each slot of the plurality of slots comprises a plurality of orthogonal frequency division multiplexing ("OFDM") symbols;
    receive the at least one TB in one or more slots of the plurality of downlink slots;
    determine a resource for transmission of hybrid automatic repeat request-acknowledgement ("HARQ-ACK") feedback based on the plurality of downlink slots associated with the at least one TB and an indication included in the downlink resource assignment, wherein the indication comprises one or more bits and indicates a basis for determining the resource; and transmit the at least one HARQ-ACK feedback for the at least one TB.

7. The UE of claim 6, wherein the downlink resource assignment is assigned for a TB, and wherein the at least one processor is configured to cause the UE to determine an uplink slot based on a last downlink slot of the plurality of downlink slots, wherein the HARQ-ACK feedback for the TB is transmitted in the uplink slot.

8. The UE of claim 6, wherein the downlink resource assignment is assigned for a plurality of TBs, and wherein the at least one processor is configured to cause the UE to determine a plurality of uplink slots, each uplink slot based on a last downlink slot of each TB of the plurality of TBs, wherein each HARQ-ACK feedback for each TB is transmitted in each uplink slot of the plurality of uplink slots.

9. The UE of claim 6, wherein the at least one processor is configured to cause the UE to:

receive a higher layer message configuring a set of physical uplink control channel ("PUCCH") resources; and determine a PUCCH resource from the set of PUCCH resources based on downlink control information ("DCI") and the downlink resource assignment; and transmit the at least one HARQ-ACK feedback based on the PUCCH resource.

10. The UE of claim 9, wherein the PUCCH resource is determined based on the DCI and a lowest control channel element ("CCE") index of the DCI.

11. A base station for wireless communication, comprising:

at least one memory; and at least one processor coupled with the at least one memory and configured to cause the base station to:

transmit a downlink resource assignment associated with a plurality of downlink slots for data transmission of at least one transport block ("TB"), wherein each slot of the plurality of slots comprises a plurality of orthogonal frequency division multiplexing ("OFDM") symbols;

transmit the at least one TB in one or more slots of the plurality of downlink slots; and receive at least one hybrid automatic repeat request-acknowledgement ("HARQ-ACK") feedback for the at least one TB, wherein a resource for reception of a respective HARQ-ACK feedback is based on the plurality of downlink slots associated with the at least one TB and an indication included in the downlink resource assignment, wherein the indication comprises one or more bits and indicates a basis for the resource.

12. The base station of claim 11, wherein the downlink resource assignment is assigned for a TB, and wherein the HARQ-ACK feedback for the TB is received in an uplink slot based on a last downlink slot of the plurality of downlink slots.

13. The base station of claim 11, wherein the downlink resource assignment is assigned for a plurality of TBs, and wherein each HARQ-ACK feedback for each TB is received in each uplink slot of a plurality of uplink slots, each uplink slot based on a last downlink slot of each TB of the plurality of TBs.

14. The base station of claim 11, wherein the at least one processor is configured to cause the base station to:

transmit a higher layer message configuring a set of physical uplink control channel ("PUCCH") resources; and receive the at least one HARQ-ACK feedback on a PUCCH resource from the set of PUCCH resources based on downlink control information ("DCI") and the downlink resource assignment.

15. A method performed by a base station, the method comprising:

transmitting a downlink resource assignment associated with a plurality of downlink slots for data transmission of at least one transport block ("TB"), wherein each slot of the plurality of slots comprises a plurality of orthogonal frequency division multiplexing ("OFDM") symbols;

transmitting the at least one TB in one or more slots of the plurality of downlink slots; and receiving at least one hybrid automatic repeat request-acknowledgement ("HARQ-ACK") feedback for the at least one TB, wherein a resource for reception of a respective HARQ-ACK feedback is based on the plurality of downlink slots associated with the at least one TB and an indication included in the downlink resource assignment, wherein the indication comprises one or more bits and indicates a basis for the resource.

16. The method of claim 15, wherein the downlink resource assignment is assigned for a TB, and wherein the HARQ-ACK feedback for the TB is received in an uplink slot based on a last downlink slot of the plurality of downlink slots.

17. The method of claim 15, wherein the downlink resource assignment is assigned for a plurality of TBs, and wherein each HARQ-ACK feedback for each TB is received in each uplink slot of a plurality of uplink slots, each uplink slot based on a last downlink slot of each TB of the plurality of TBs.

18. The method of claim 15, further comprising:

transmitting a higher layer message configuring a set of physical uplink control channel ("PUCCH") resources; and receiving the at least one HARQ-ACK feedback on a PUCCH resource from the set of PUCCH resources based on downlink control information ("DCI") and the downlink resource assignment.

* * * * *